US012786594B2

(12) United States Patent
Ikeda

(10) Patent No.: US 12,786,594 B2
(45) Date of Patent: Nov. 3, 2026

(54) LIGHT DETECTION ELEMENT AND LIGHT DETECTION DEVICE

(71) Applicant: SONY SEMICONDUCTOR SOLUTIONS CORPORATION, Kanagawa (JP)

(72) Inventor: Yasuji Ikeda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 85 days.

(21) Appl. No.: 19/035,349

(22) Filed: Jan. 23, 2025

(65) Prior Publication Data

US 2025/0168532 A1 May 22, 2025

Related U.S. Application Data

(63) Continuation of application No. 18/699,405, filed as application No. PCT/JP2022/031607 on Aug. 22, 2022, now Pat. No. 12,231,797.

(30) Foreign Application Priority Data

Oct. 15, 2021 (JP) ................................ 2021-169583

(51) Int. Cl.
*H04N 25/77* (2023.01)
*H04N 25/773* (2023.01)

(52) U.S. Cl.
CPC ................................ *H04N 25/773* (2023.01)

(58) Field of Classification Search
CPC .... H04N 25/77; H04N 25/773; H04N 25/532; G01N 1/44
See application file for complete search history.

(56) References Cited

U.S. PATENT DOCUMENTS

2023/0388675 A1 11/2023 Tojima
2024/0340552 A1* 10/2024 Niwa .................. H04N 25/443

FOREIGN PATENT DOCUMENTS

JP 2020-123847 A 8/2020
JP 2021-019281 A 2/2021

OTHER PUBLICATIONS

International Search Report and Written Opinion of PCT Application No. PCT/JP2022/031607, issued on Oct. 25, 2022, 05 pages of English Translation and 06 pages of ISRWO.

(Continued)

*Primary Examiner* — Kevin K Pyo
(74) *Attorney, Agent, or Firm* — CHIP LAW GROUP

(57) ABSTRACT

To reduce consumed electric power in a light detection element. The light detection element includes a photoelectric conversion section, a disconnection section, and a recharge section. In this light detection element, the disconnection section connects the photoelectric conversion section and a predetermined detection node in a predetermined connection period and disconnects the photoelectric conversion section from the detection node in a wait period not corresponding to the connection period. Moreover, in the light detection element, the recharge section supplies a predetermined voltage to the detection node over a predetermined period from a predetermined recharge start timing in the connection period.

8 Claims, 44 Drawing Sheets

(56) References Cited

OTHER PUBLICATIONS

Notice of Allowance for U.S. Appl. No. 18/699,405, issued on Oct. 16, 2024, 09 pages.
International Preliminary Report on Patentability of PCT Application No. PCT/JP2022/031607, issued on Apr. 25, 2024, 05 pages of English Translation and 03 pages of IPRP.

* cited by examiner

LIGHT DETECTION ELEMENT AND LIGHT DETECTION DEVICE

CROSS-REFERENCE TO RELATED APPLICATIONS

The present application is a continuation application of U.S. patent application Ser. No. 18/699,405, filed Apr. 8, 2024, which is a National Stage Entry of PCT/JP2022/031607, filed on Aug. 22, 2022, and claims the benefit of priority from Japanese Priority Patent Application JP 2021-169583 filed in the Japan Patent Office Oct. 15, 2021, the entire contents of which are hereby incorporated by reference.

TECHNICAL FIELD

The present technology relates to a light detection element and a light detection device. More specifically, the present technology relates to a light detection element and a light detection device which count the number of photons.

BACKGROUND ART

Hitherto, a solid-state imaging element formed by arranging a plurality of pixels for capturing image data is used in an imaging device and the like. For example, there is proposed a solid-state imaging element in which each pixel is provided with a SPAD (Single-Photon Avalanche Diode) and a detection circuit which generates a pulse signal on the basis of electric potential of a cathode of the SPAD (for example, see PTL 1).

CITATION LIST

Patent Literature

[PTL 1]
JP 2020-123847A

SUMMARY

Technical Problem

According to the related technology described above, faint light can be detected by a highly sensitive SPAD. However, in the solid-state imaging element described above, a plurality of transistors is connected to a cathode of the SPAD, and accordingly, in association with this, a wiring length from the cathode becomes long, so that a capacitance of the cathode becomes large. As a result of this increase in capacitance, an electric charge amount required to increase the electric potential of the cathode to a given electric potential becomes large, and hence, there is posed such a problem as an increase in consumed electric power. In particular, when a stacked structure is employed, the wiring from the cathode becomes long, hence the capacitance becomes large, and the consumed electric power consequently further increases.

The present technology has been made in view of this situation and has an object to reduce consumed electric power in a light detection element.

Solution to Problem

The present technology is made to solve the problem described above, and a first aspect thereof is a light detection element including a photoelectric conversion section, a disconnection section which connects the photoelectric conversion section and a predetermined detection node to each other in a predetermined connection period and disconnects the photoelectric conversion section from the detection node in a wait period not corresponding to the connection period, and a recharge section which supplies a predetermined voltage to the detection node over a predetermined period from a predetermined recharge start timing in the connection period, and a control method thereof. As a result, there is provided such an effect that consumed electric power decreases.

Moreover, this first aspect may further include a control circuit which controls the disconnection section and the recharge section. As a result, there is provided such an effect that operations of the disconnection section and the recharge section are controlled.

Moreover, in this first aspect, the control circuit may change a length of a detection cycle including the wait period and the connection period. As a result, there is provided such an effect that a dynamic range is extended.

Moreover, this first aspect may further include a level shifter which changes a level of the clip control signal. As a result, there is provided such an effect that a circuit at a low voltage can be used.

Moreover, in this first aspect, the recharge section may include a pair of transistors serially connected between the detection node and a predetermined power supply voltage, a first control signal may be input to a gate of one of the pair of transistors, a second control signal may be input to a gate of the other one of the pair of transistors, and the control circuit may supply the first and second control signals. As a result, there is provided such an effect that a through-current is suppressed.

Moreover, in this first aspect, the photoelectric conversion section, the disconnection section, and the recharge section may be arranged for each of multiple pixels, and a start timing of the connection period and the recharge start timing may be different from one another among a plurality of areas. As a result, there is provided such an effect that an IR drop is suppressed.

Moreover, this first aspect may further include a register which holds input setting information, and the control circuit may control the disconnection section and the recharge section on the basis of the held setting information. As a result, there is provided such an effect that a measurement cycle and the like are externally controlled.

Moreover, this first aspect may further include a detection circuit which generates a pulse signal on the basis of electric potential of the detection node, and a counter which counts the number of pulses of the pulse signal, thereby generating a count value. As a result, there is provided such an effect that the number of photons is counted.

Moreover, this first aspect may further include an inverter which inverts a control signal from the control circuit to supply the inverted control signal as an inverted signal, and the detection circuit may generate the pulse signal on the basis of the electric potential of the detection node and the inverted signal. As a result, there is provided such an effect that a need for supply of a control signal for initialization is eliminated.

Moreover, this first aspect may further include an arithmetic operation circuit which adds a value obtained by shifting according to a shifting number same as the number of times of overflow of the counter and a bit string indicating the count value to each other. As a result, there is provided such an effect that the count value is extended.

Moreover, this first aspect may further include a mask circuit which masks control signals from the control circuit to the disconnection section and the recharge section in a case in which the number of pulses exceeds a predetermined threshold value. As a result, there is provided such an effect that saturation of the count value is suppressed.

Moreover, in this first aspect, the detection circuit may generate the pulse signal on the basis of the electric potential of the detection node and a control signal from the control circuit. As a result, there is provided such an effect that detection omission and false detection of the photon are suppressed.

Moreover, in this first aspect, the detection circuit may include a pMOS transistor and an nMOS transistor serially connected between a power supply voltage and a ground voltage, a gate of the pMOS transistor may be connected to the detection node, and the control signal may be input to a gate of the nMOS transistor. As a result, there is provided the effect that the detection omission and the false detection of the photon are suppressed.

Moreover, in this first aspect, the detection circuit may include first and second pMOS transistors and an nMOS transistor serially connected between a power supply voltage and a ground voltage, a gate of the second pMOS transistor may be connected to the detection node, and the initialization control signal may be input to each of gates of the first pMOS transistor and the nMOS transistor. As a result, there is provided the effect that the detection omission and the false detection of the photon are suppressed.

Moreover, in this first aspect, the photoelectric conversion section may be arranged in a predetermined layer, and the disconnection section and the recharge section may be arranged in a layer different from the predetermined layer. As a result, there is provided such an effect that a circuit scale and an area for each pixel are reduced.

Moreover, in this first aspect, the disconnection section may be inserted between a cathode of the photoelectric conversion section and the detection node. As a result, there is provided such an effect that capacitance of the cathode is reduced.

Moreover, in this first aspect, the disconnection section may be inserted between an anode of the photoelectric conversion section and the detection node. As a result, there is provided such an effect that capacitance of the anode is reduced.

Moreover, in this first aspect, the photoelectric conversion section may include an avalanche photodiode. As a result, there is provided such an effect that the photon is detected.

Moreover, in this first aspect, the disconnection section may include a clip transistor inserted between the detection node and the photoelectric conversion section. As a result, there is provided such an effect that the photoelectric conversion section is disconnected by the transistor.

Moreover, a second aspect of the present technology is a light detection device including a photoelectric conversion section, a disconnection section which connects the photoelectric conversion section and a predetermined detection node to each other in a predetermined connection period and disconnects the photoelectric conversion section from the detection node in a wait period not corresponding to the connection period, a recharge section which supplies a predetermined voltage to the detection node over a predetermined period from a predetermined recharge start timing in the connection period, and a recording section which records data generated from electric potential of the detection node. As a result, there is provided such an effect that consumed electric power of the light detection device decreases.

DESCRIPTION OF EMBODIMENTS

A description is now given of forms for embodying the present technology (hereinafter referred to as embodiments). The description is given in the following order.

1. First embodiment (an example in which a clip transistor is inserted)
2. Second embodiment (an example in which the clip transistor is inserted and a measurement cycle is changed)
3. Third embodiment (an example in which the clip transistor is inserted and a control circuit initializes a detection circuit)
4. Fourth embodiment (an example in which the clip transistor is inserted and a through-current of the detection circuit is prevented)
5. Fifth embodiment (an example in which the clip transistor and a level shifter are inserted)
6. Sixth embodiment (an example in which the clip transistor is inserted and a variation of a recharge period is suppressed)
7. Seventh embodiment (an example in which the clip transistor is inserted and phases of control signals are shifted row by row)
8. Eighth embodiment (an example in which the clip transistor is inserted and a stacked structure is employed)
9. Ninth embodiment (an example in which the clip transistor is inserted and a count value is extended)
10. Tenth embodiment (an example in which the clip transistor is inserted and external control is employed)
11. Eleventh embodiment (an example in which the clip transistor is inserted and the control signals are masked)
12. Twelfth embodiment (an example in which the clip transistor is inserted on an anode side)
13. An example of application to a moving body

1. First Embodiment (Configuration Example of Imaging Device)

Figure 1:
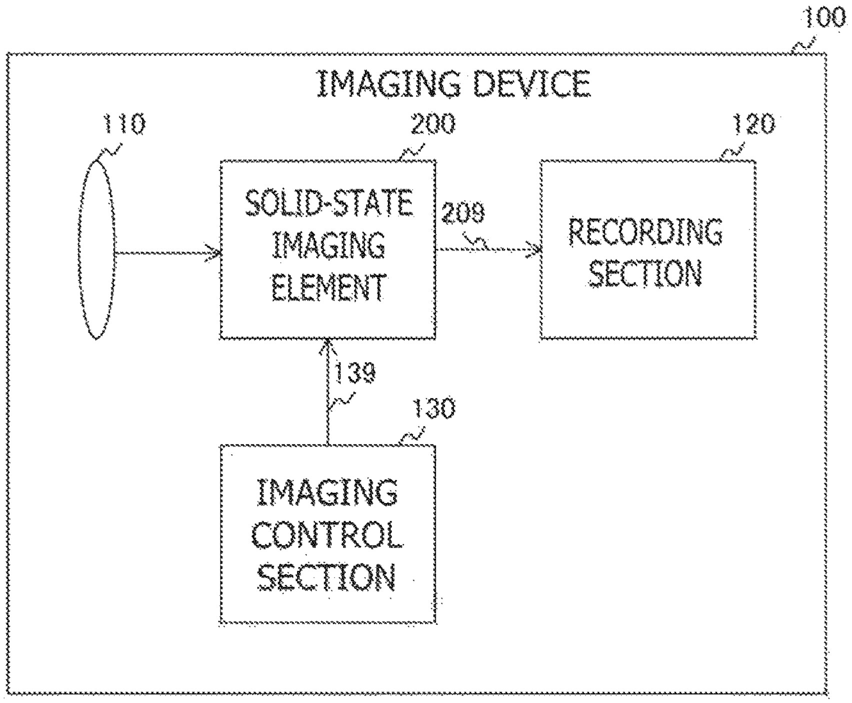
FIG. 1 is a block diagram for illustrating a configuration example of an imaging device in a first embodiment of the present technology.

FIG. 1 is a block diagram for illustrating a configuration example of an imaging device 100 in an embodiment of the present technology. This imaging device 100 captures image data and includes an imaging lens 110, a solid-state imaging element 200, a recording section 120, and an imaging control section 130. As the imaging device 100, for example, a smartphone, a digital camera, a personal computer, a vehicle-mounted camera, and an IoT (Internet of Things) camera are assumed. Note that the imaging device 100 is an example of a light detection device described in CLAIMS.

The imaging lens 110 collects incident light and leads the collected incident light to the solid-state imaging element 200. The solid-state imaging element 200 captures the image data under the control of the imaging control section 130. This solid-state imaging element 200 supplies the captured image data to the recording section 120 via a signal line 209. The recording section 120 records the image data. Note that the solid-state imaging element 200 is an example of a light detection element described in CLAIMS.

The imaging control section 130 controls the solid-state imaging element 200 to cause the image data to be captured. This imaging control section 130 supplies synchronization signals such as a vertical synchronization signal, for example, to the solid-state imaging element 200 via a signal line 139.

Note that the imaging device 100 may further include an interface and may transmit the image data through this interface to the outside or may further include a display section and may cause the image data to be displayed on the display section.

(Configuration Example of Solid-State Imaging Element)

Figure 2:
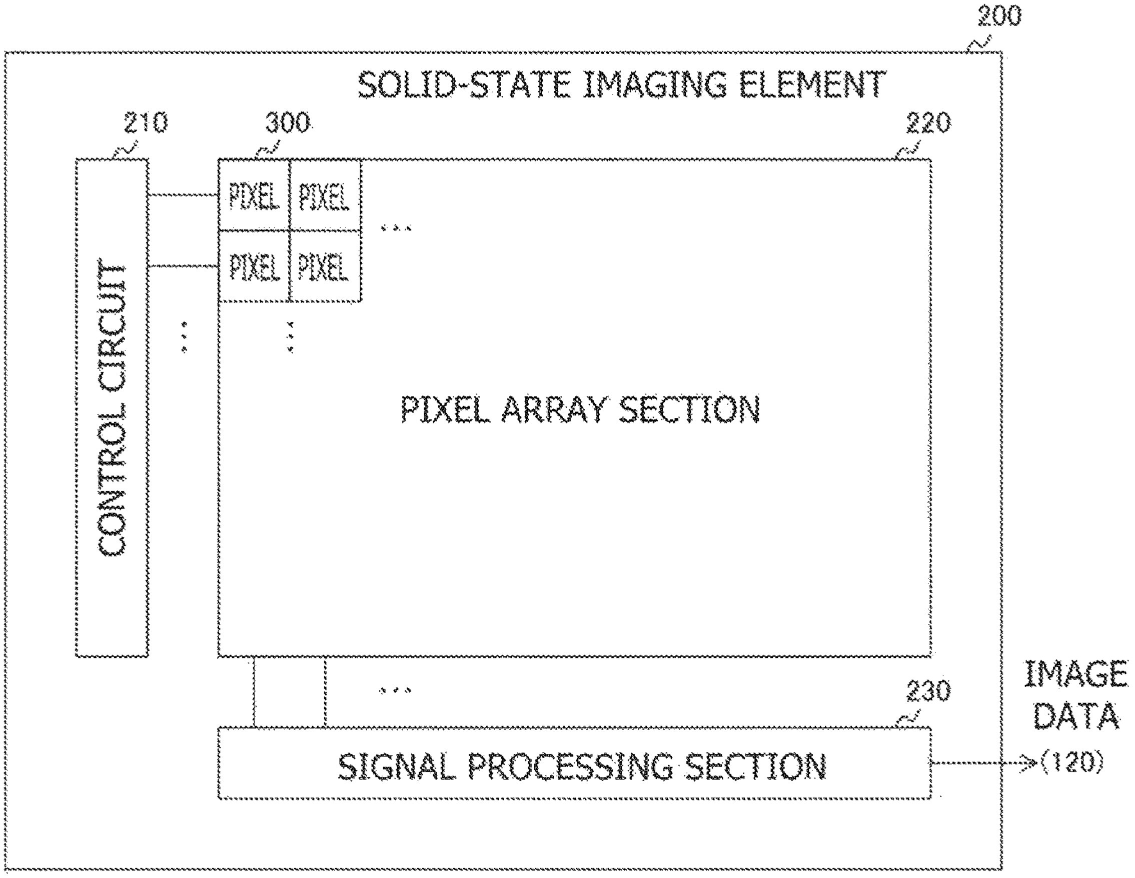
FIG. 2 is a block diagram for illustrating a configuration example of a solid-state imaging element in the first embodiment of the present technology.

FIG. 2 is a block diagram for illustrating a configuration example of the solid-state imaging element 200 in the first embodiment of the present technology. This solid-state imaging element 200 includes a control circuit 210, a pixel array section 220, and a signal processing section 230. These circuits are arranged on a single semiconductor substrate.

A plurality of pixels 300 is arranged in a two-dimensional grid form on the pixel array section 220. Hereinafter, a set of pixels 300 arranged in a predetermined direction (such as horizontal direction) is referred to as a "row," and a set of pixels 300 arranged in a direction perpendicular to the row is referred to as a column.

The control circuit 210 sequentially selects the row in synchronism with the vertical synchronization signal. The pixel 300 counts the number of times of incidence of the photon during an exposure period and outputs data indicating a count value thereof as pixel data to the signal processing section 230.

The signal processing section 230 applies various types of signal processing to the image data obtained by arranging the pixel data. This signal processing section 230 outputs the image data obtained after the processing to the recording section 120.

(Configuration Example of Pixel)

Figure 3:
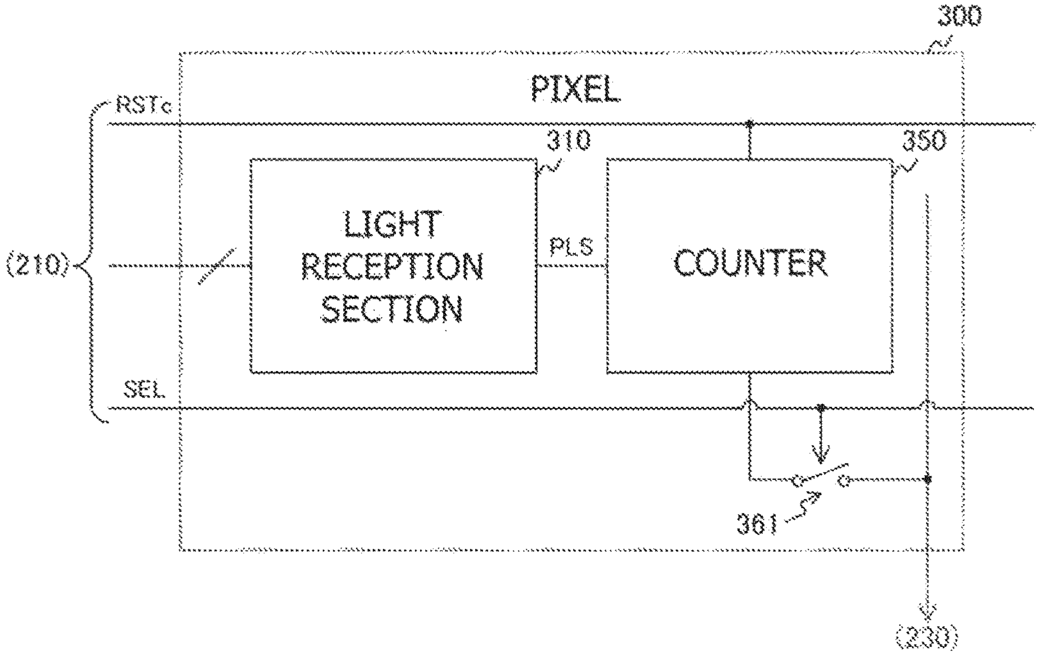
FIG. 3 is a block diagram for illustrating a configuration example of a pixel in the first embodiment of the present technology.

FIG. 3 is a block diagram for illustrating a configuration example of the pixel 300 in the first embodiment of the present technology. This pixel 300 includes a light reception section 310, a counter 350, and a selection switch 361.

The light reception section 310 generates a pulse signal PLS in response to the incidence of the photon and supplies the pulse signal PLS to the counter 350. The counter 350 counts the number of pulses of the pulse signal PLS. This counter 350 supplies the pixel data indicating the count value to the selection switch 361. Moreover, the count value of the counter 350 is initialized by a reset signal RSTc from the control circuit 210.

The selection switch 361 supplies the pixel data to the signal processing section 230 according to a selection signal SEL from the control circuit 210.

(Configuration Example of Light Reception Section)

Figure 4:
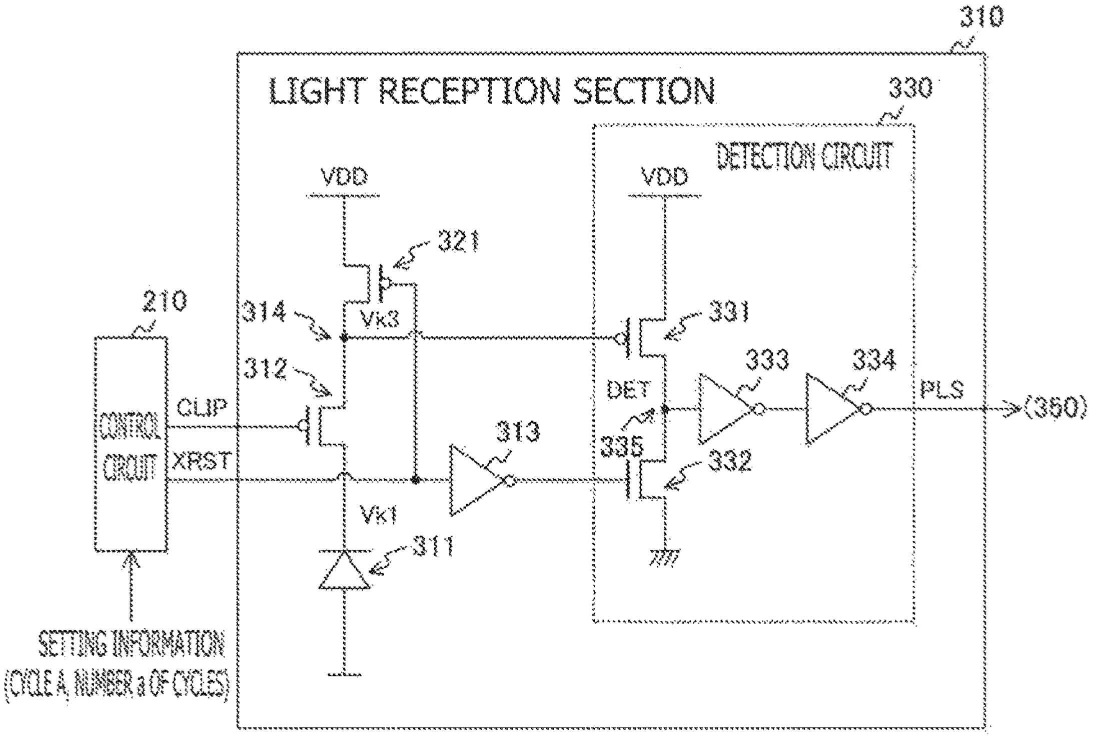
FIG. 4 is a circuit diagram for illustrating a configuration example of a light reception section in the first embodiment of the present technology.

FIG. 4 is a circuit diagram for illustrating a configuration example of the light reception section 310 in the first embodiment of the present technology. This light reception section 310 includes a SPAD 311, a clip transistor 312, an inverter 313, a recharge transistor 321, and a detection circuit 330. As the clip transistor 312 and the recharge transistor 321, for example, pMOS (p-channel Metal Oxide Semiconductor) transistors are used.

An anode of the SPAD 311 is connected to a predetermined electric potential lower than a power supply voltage VDD, and a cathode is connected to the clip transistor 312. A cathode electric potential of this SPAD 311 is denoted as Vk1. Note that the SPAD 311 is an example of a photoelectric conversion section described in CLAIMS.

The clip transistor 312 and the recharge transistor 321 are serially connected between the power supply voltage VDD and the cathode of the SPAD 311 such that the recharge transistor 321 is on the power supply side. A connection node between these clip transistor 312 and recharge transistor 321 is hereinafter referred to as a "detection node 314," and electric potential thereof is denoted as Vk3.

Moreover, a control signal CLIP is input from the control circuit 210 to a gate of the clip transistor 312. A control signal XRST is input from the control circuit 210 to a gate of the recharge transistor 321 and the inverter 313. Note that the clip transistor 312 is an example of a disconnection section described in CLAIMS.

The inverter 313 inverts the control signal XRST and supplies the inverted signal to the detection circuit 330.

The detection circuit 330 detects incidence of the photon and generates the pulse signal PLS. This detection circuit 330 includes a pMOS transistor 331, an nMOS (n-channel MOS) transistor 332, an inverter 333, and an inverter 334.

The pMOS transistor 331 and the nMOS transistor 332 are serially connected between the power supply voltage VDD and a ground voltage such that the pMOS transistor 331 is on the power supply side. A gate of the pMOS transistor 331 is connected to the detection node 314, and the inverted signal is input from the inverter 313 to a gate of the nMOS transistor 332. A signal at electric potential of a connection node 335 between these pMOS transistor 331 and nMOS transistor 332 is denoted as a detection signal DET.

The inverter 333 inverts the detection signal DET. The inverter 334 inverts the inverted signal from the inverter 333 and supplies this further inverted signal to the counter 350 as the pulse signal PLS.

Moreover, setting information for controlling pixel 300 is input to the control circuit 210. This setting information includes a set value of each of a measurement cycle and the number of cycles. The measurement cycle is a cycle for measuring the incidence of the photon, and the number of cycles is the number of times of repetition of control of this measurement cycle. The measurement is executed over the exposure period, and when the set value of the measurement cycle is denoted as A and the set value of the number of cycles is noted as "a," A×a takes the same value as the exposure period.

The control circuit 210 sets the control signal CLIP to a high level and then sets the control signal CLIP to a low level, in the measurement cycle. The detection node 314 is disconnected from the cathode of the SPAD 311 in the period which is of the measurement cycle and in which the control signal CLIP is at the high level, and this period is hereinafter referred to as a "wait period" in which the incidence of the photon is waited for. Meanwhile, the detection node 314 is connected to the SPAD 311 in the period which is of the measurement cycle and in which the control signal CLIP is at the low level, and this period is hereinafter referred to as a "connection period."

When the photon enters in the wait period, the avalanche multiplication occurs in the SPAD 311, and a cathode electric potential Vk1 thereof decreases to a given electric potential. The clip transistor 312 connects the detection node 314 to the SPAD 311 during the subsequent connection period. Thus, when the photon enters in the wait period, electric charge is transferred to the detection node 314 in the connection period, and the pulse signal PLS becomes the high level.

Moreover, the control circuit 210 sets the control signal XRST to the low level over a predetermined period from the predetermined recharge start timing in the connection period. As a result, the recharge transistor 321 supplies the power supply voltage VDD to the detection node 314. This detection node 314 is connected to the cathode, and hence, a recharge operation of returning the cathode electric potential Vk1 to the power supply voltage VDD is executed. Moreover, the detection circuit 330 is initialized by the control signal XRST at the low level.

In summary, the clip transistor 312 connects the SPAD 311 and the detection node 314 to each other in the connection period and disconnects the SPAD 311 from the detection node 314 in the wait period. Moreover, the recharge transistor 321 supplies the power supply voltage VDD to the detection node 314 over a predetermined period from the recharge start timing in the connection period. Note that the recharge transistor 321 is an example of a recharge section described in CLAIMS.

Such a configuration that the clip transistor 312 is not provided and the cathode is directly connected to the detection circuit 330 or the like is assumed as a comparative example. In this comparative example, a plurality of transistors such as the transistor in the detection circuit 330, and the recharge transistor 321 is connected to the cathode. As the number of transistors connected to the cathode increases and wiring distances from the cathode to the transistors increase, capacitance of the cathode increases.

Meanwhile, in the configuration that the clip transistor 312 is inserted between the cathode and the detection node 314 as exemplified in this diagram, the number of the transistors connected to the cathode is only one. Moreover, the wiring distances between the cathode and the transistors connected to this cathode can be made shorter than those in the comparative example. The number of transistors connected to the cathode is the minimum, and the wiring distances are short, and hence, the capacitance of the cathode can be made smaller than that in the comparative example. As a result of the reduction in the capacitance of the cathode, an electric charge amount required to increase the cathode electric potential to the power supply voltage at the time of the detection of the photon is reduced, so that the consumed electric power can be reduced.

Note that the circuit configuration of this diagram is applied to the imaging device 100, but the application target is not limited to the imaging device 100. For example, the circuit configuration of this diagram can also be applied to a ranging module which measures a distance by the ToF (Time of Flight) method.

(Operation Example of Solid-State Imaging Element)

Figure 5:
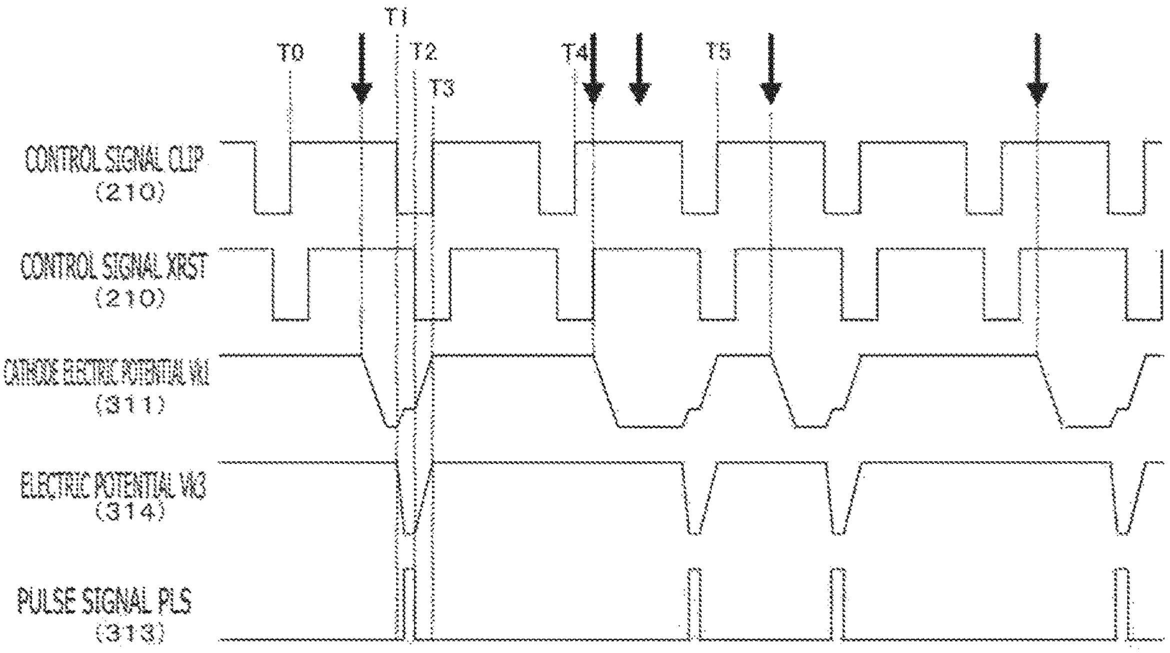
FIG. 5 is a timing chart for illustrating an example of an operation of the solid-state imaging element in the first embodiment of the present technology.

FIG. 5 is a timing chart for illustrating an example of the operation of the solid-state imaging element 200 in the first embodiment of the present technology. In an initial state, both the cathode electric potential Vk1 and the electric potential Vk3 of the detection node are the power supply voltage VDD.

Of the measurement cycle from a timing T0 to a timing T3, a period to a timing T1 corresponds to the wait period, and a period from the timing T1 to the timing T3 corresponds to the connection period. The control circuit 210 sets the control signal CLIP to the high level in the wait period. Moreover, the control signal XRST is controlled to be at the high level from the predetermined timing in the wait period over a fixed period.

It is assumed that the photon enters in the wait period from the timing T0 to the timing T1. In this timing chart, arrows indicate incident timings of the photon. The avalanche multiplication occurs in the SPAD 311 as a result of the incidence of the photon, the cathode electric potential Vk1 decreases to a given electric potential, and the avalanche multiplication stops at this time. In the wait period, the detection node 314 is disconnected, and hence, the electric potential Vk3 does not swing.

When the cathode of the SPAD 311 is connected to the detection node 314 at the timing T1, a part of the electric charge of the cathode moves to the detection node 314. As a result, the electric potential Vk3 of the detection node 314 decreases, and the cathode electric potential Vk1 increases by an amount of the movement of the electric charge. Moreover, when the electric potential Vk3 becomes a threshold value of the pMOS transistor 331 or less, this pMOS transistor 331 is put into an ON state, and the pulse signal PLS rises.

The control circuit 210 sets the control signal XRST to the low level over a predetermined period from the timing T2 in the connection period. As a result, the power supply voltage VDD is supplied, and the electric potential Vk3 of the detection node 314 is initialized to the power supply voltage VDD. Moreover, the detection node 314 is connected to the cathode, and hence, the cathode electric potential Vk1 is also initialized to the power supply voltage VDD. Simultaneously, the detection circuit 330 is initialized, and hence, the pulse signal PLS falls.

As described above, the pixel 300 transitions to the detection state for detecting the photon in a period from the timing T1 to the timing T2 of the connection period and transitions to the recharge state in a period from the timing T2 to the timing T3.

It is possible to generate one pulse when the photon incidence occurs one or more times in the wait period for each measurement cycle by repeating the control in the measurement cycle described above. For example, the photon does not enter in the wait period in the measurement cycle from the timing T3 to the timing T4, and hence, the pulse is not generated in the connection period thereof. Meanwhile, in a measurement cycle from the timing T4 to a timing T5, the photon incidence occurs twice, and hence, one pulse is generated.

As described above, according to the first embodiment of the present technology, there is provided the clip transistor 312 which connects and disconnects the cathode of the SPAD 311 and the detection node 314 to each other and from each other, respectively, and hence, the capacitance of the cathode can be reduced. As a result, the consumed electric power can be reduced.

2. Second Embodiment

In the first embodiment described above, the measurement cycle is fixed, but it is difficult to further reduce the consumed electric power in this configuration. The solid-state imaging element 200 in a second embodiment is different from that in the first embodiment in such a point that the length of the measurement cycle is changed.

Figure 6:
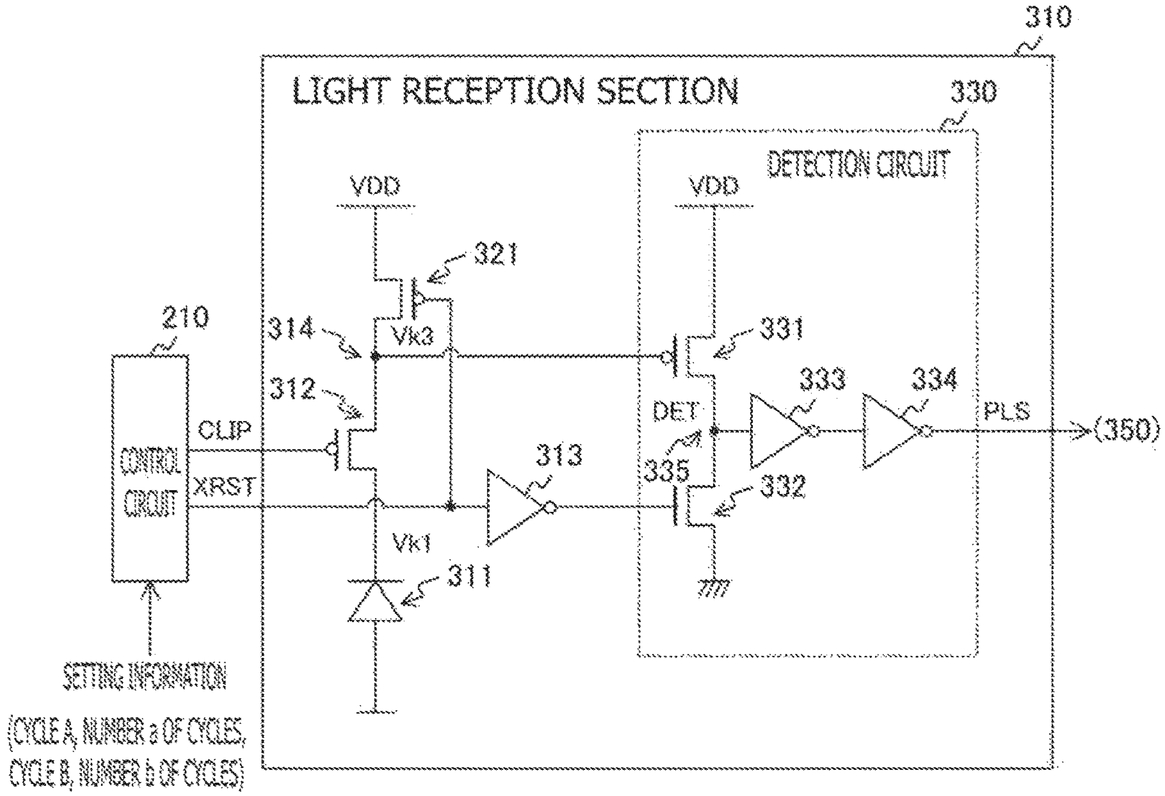
FIG. 6 is a circuit diagram for illustrating a configuration example of the light reception section in a second embodiment of the present technology.

FIG. 6 is a circuit diagram for illustrating a configuration example of the light reception section 310 in the second embodiment of the present technology. In this second embodiment, multiple sets each including a set value of the measurement cycle and a set value of the number of cycles are input to the control circuit 210. For example, a set including the measurement cycle A and the number "a" of cycles and a set including a measurement cycle B and the number "b" of cycles are input.

The control circuit 210 changes the length of the measurement cycle each time the number of cycles corresponding to the measurement cycle elapses in an imaging period of one frame. For example, it is assumed that the number "a" of cycles is "6," and the number "b" of cycles is "4."

Figure 7:
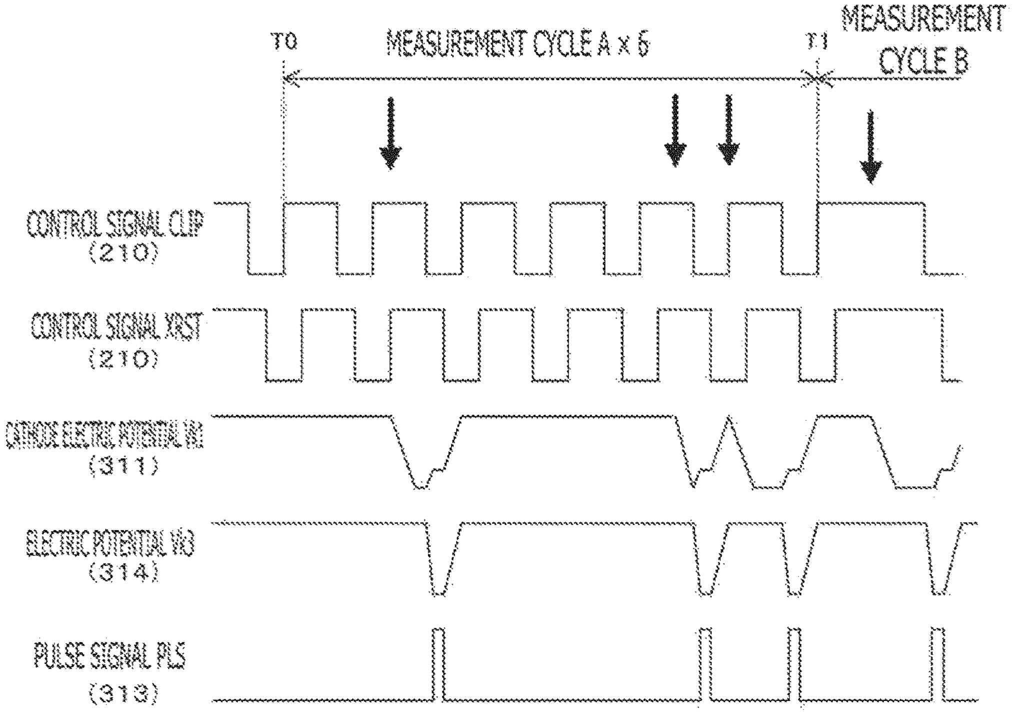
FIG. 7 is a timing chart for illustrating an example of an operation before switching of a detection cycle in the second embodiment of the present technology.

In this case, as exemplified in FIG. 7, the pixel 300 measures the incidence of the photon over the six cycles from a timing T0 to a timing T1 in the measurement cycle A.

Figure 8:
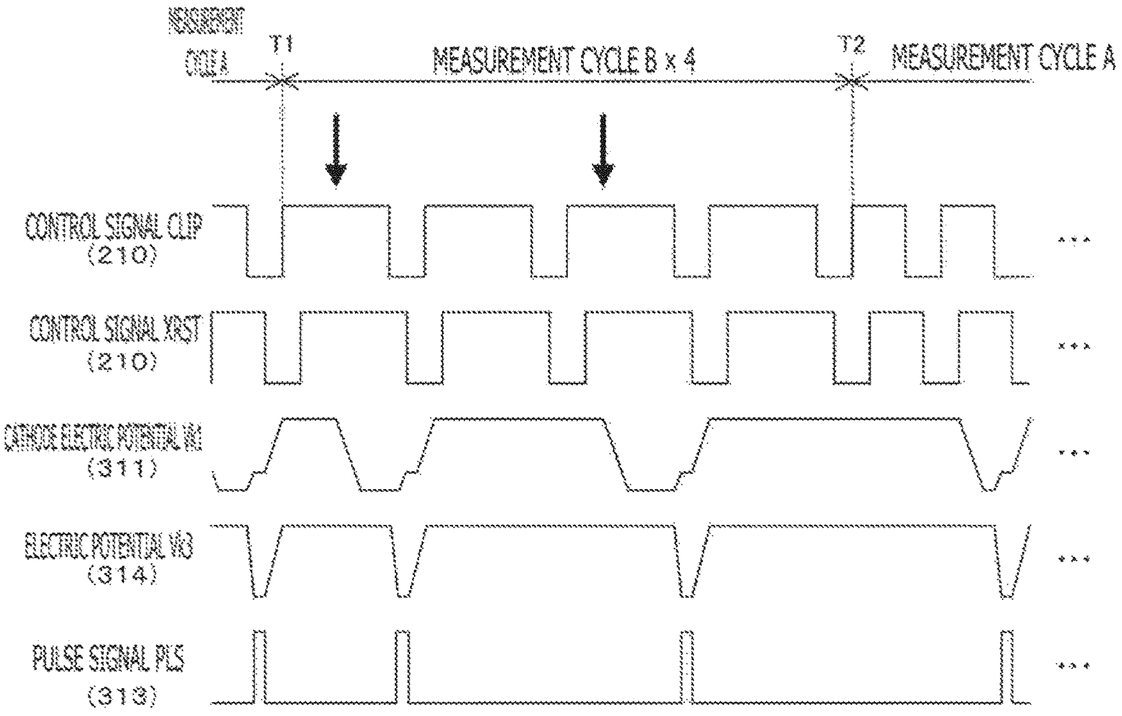
FIG. 8 is a timing chart for illustrating an example of an operation after the switching of the detection cycle in the second embodiment of the present technology.

After that, as exemplified in FIG. 8, the pixel 300 changes the measurement cycle from A to B and measures the incidence of the photon at the measurement cycle B over the four cycles from the timing T1 to a timing T2.

Figure 9:
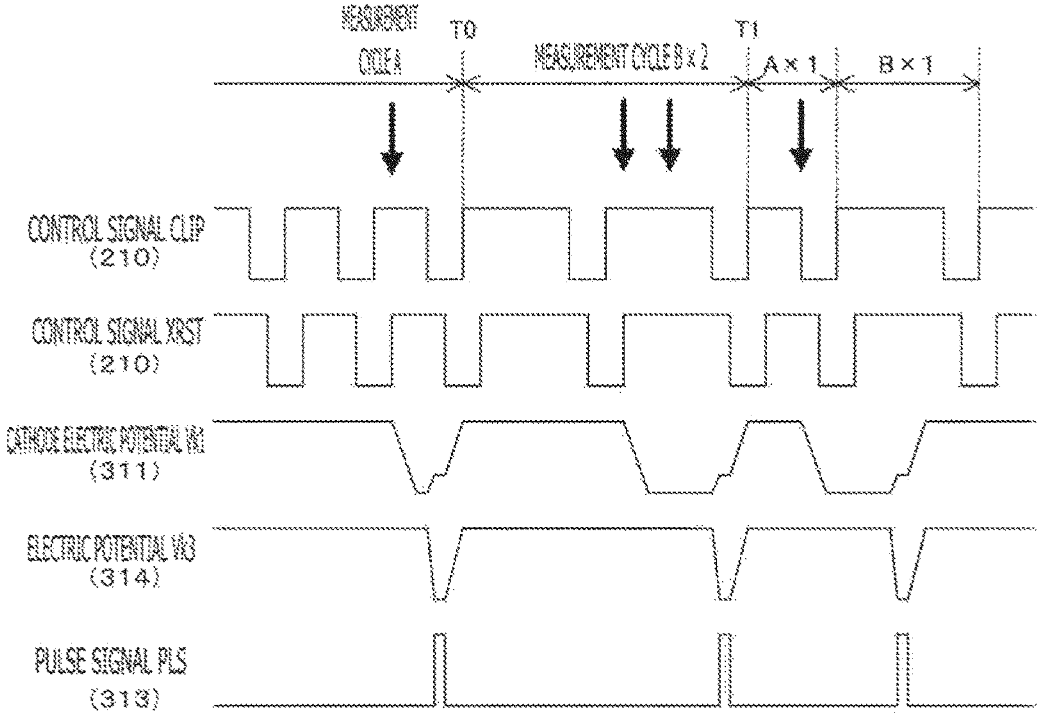
FIG. 9 is a timing chart for illustrating an example of an operation of randomly switching the detection cycle in the second embodiment of the present technology.
Figure 10:
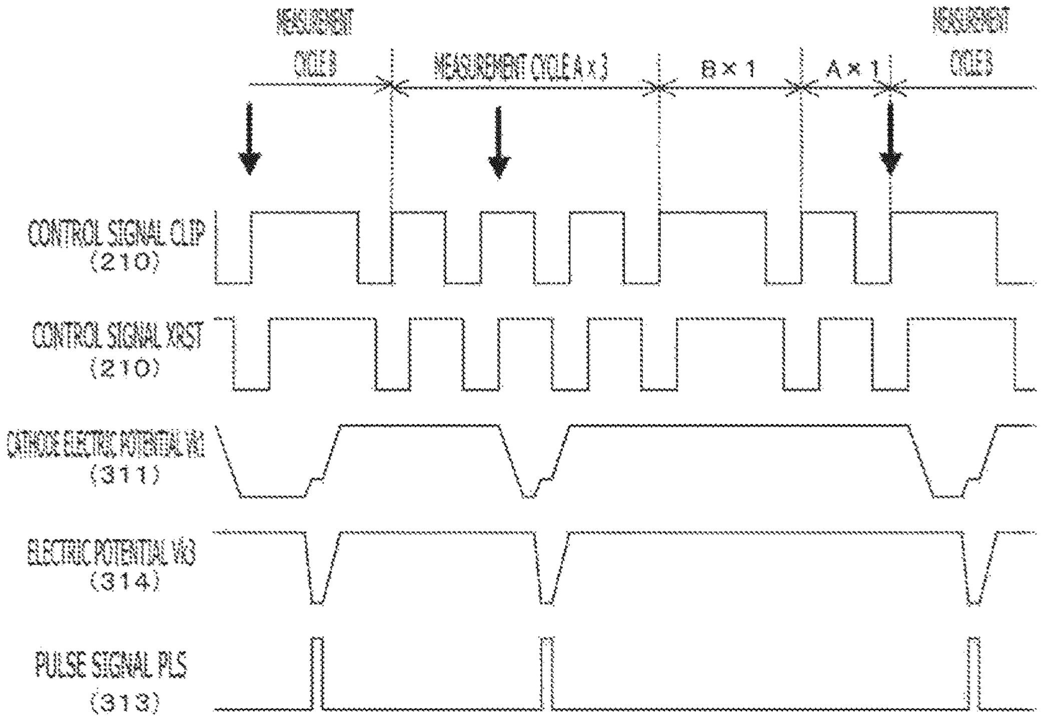
FIG. 10 is a timing chart for illustrating an example of an operation of randomly switching the detection cycle in the second embodiment of the present technology.

Note that, as exemplified in FIG. 9 and FIG. 10, each time the measurement cycle is changed, the number of cycles can randomly be set. For example, in FIG. 9, when the measurement cycle is changed from A to B at a timing T0, the solid-state imaging element 200 sets the number of cycles to a random value (in this diagram, "2"). When the measurement cycle is changed from B to A at a timing T1 at which cycles corresponding to that number have elapsed, the solid-state imaging element 200 again sets the number of cycles to a random value (in this diagram, "1").

Figure 11:
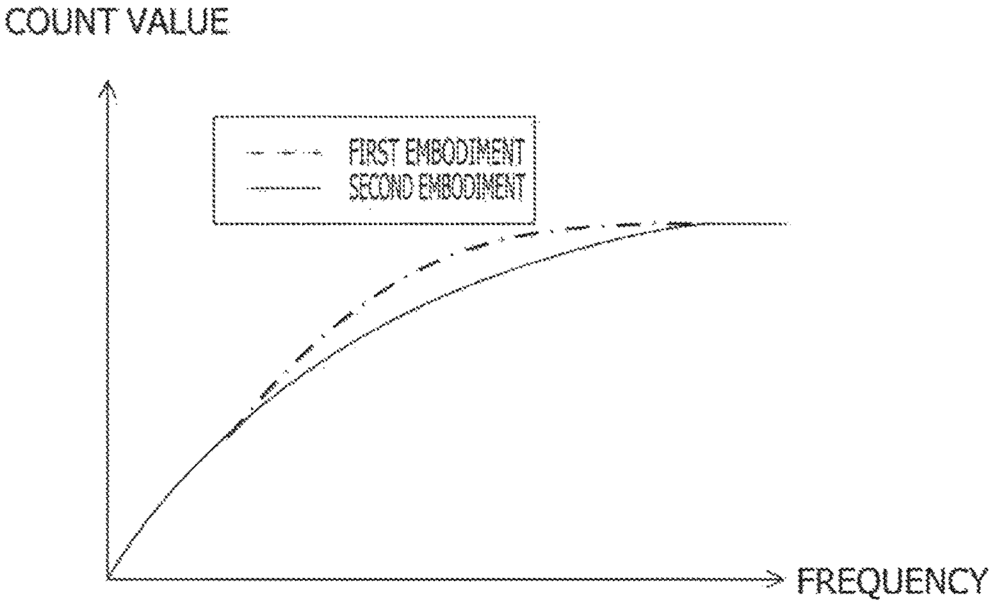
FIG. 11 is a graph for illustrating an example of input and output characteristics of pixels in the second embodiment of the present technology and a comparison target.

FIG. 11 is a graph for illustrating an example of input and output characteristics of pixels 300 in the second embodiment of the present technology and a comparison target. A vertical axis in this graph represents a count value (in other words, the number of pulses) of the counter 350, and a horizontal axis represents a frequency of the photon entering the pixel 300. Moreover, a solid line in the graph indicates a characteristic of the pixel 300 in the second embodiment having a plurality of measurement cycles, and a one-dot chain line indicates a characteristic of the pixel 300 in the first embodiment having a fixed measurement cycle.

As exemplified in this graph, in the second embodiment, it is possible to count up to a higher frequency than in the first embodiment. Thus, at the same frequency, the count value of the second embodiment is smaller, and hence, the number of bits of a digital signal representing the count value and the consumed electric power can be reduced.

As described above, according to the second embodiment of the present technology, the control circuit 210 changes the length of the measurement cycle, and hence, the number of bits of the digital signal and the consumed electric power can be reduced compared with the first embodiment.

3. Third Embodiment

In the first embodiment described above, the detection circuit 330 is initialized by the signal obtained by inverting the control signal XRST, but there is a risk in that false detection of the photon and detection omission of the photon occur in this configuration. The solid-state imaging element 200 in a third embodiment is different from that in the first embodiment in such a point that the detection circuit 330 is initialized by a control signal from the control circuit 210.

Figure 12:
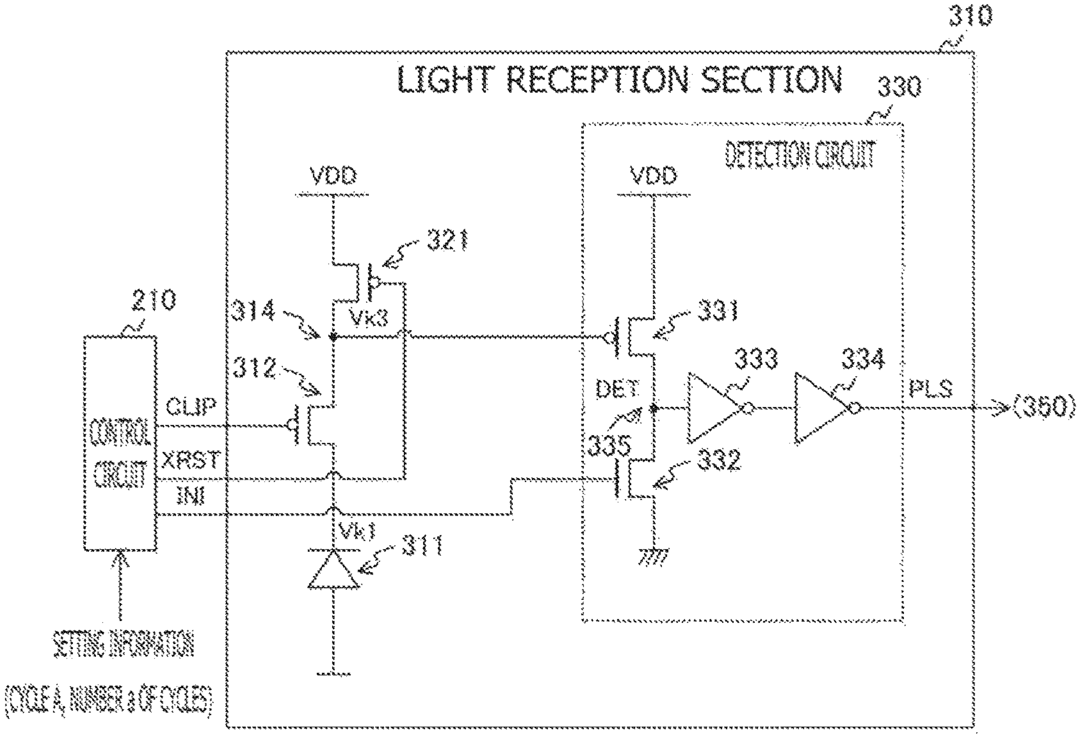
FIG. 12 is a circuit diagram for illustrating a configuration example of the light reception section in a third embodiment of the present technology.

FIG. 12 is a circuit diagram for illustrating a configuration example of the light reception section 310 in the third embodiment of the present technology. The inverter 313 is not arranged in the light reception section 310 in this third embodiment. Moreover, the control circuit 210 in the third embodiment further generates a control signal INI different from the control signal XRST and supplies the control signal INI to the gate of the nMOS transistor 332.

Figure 13:
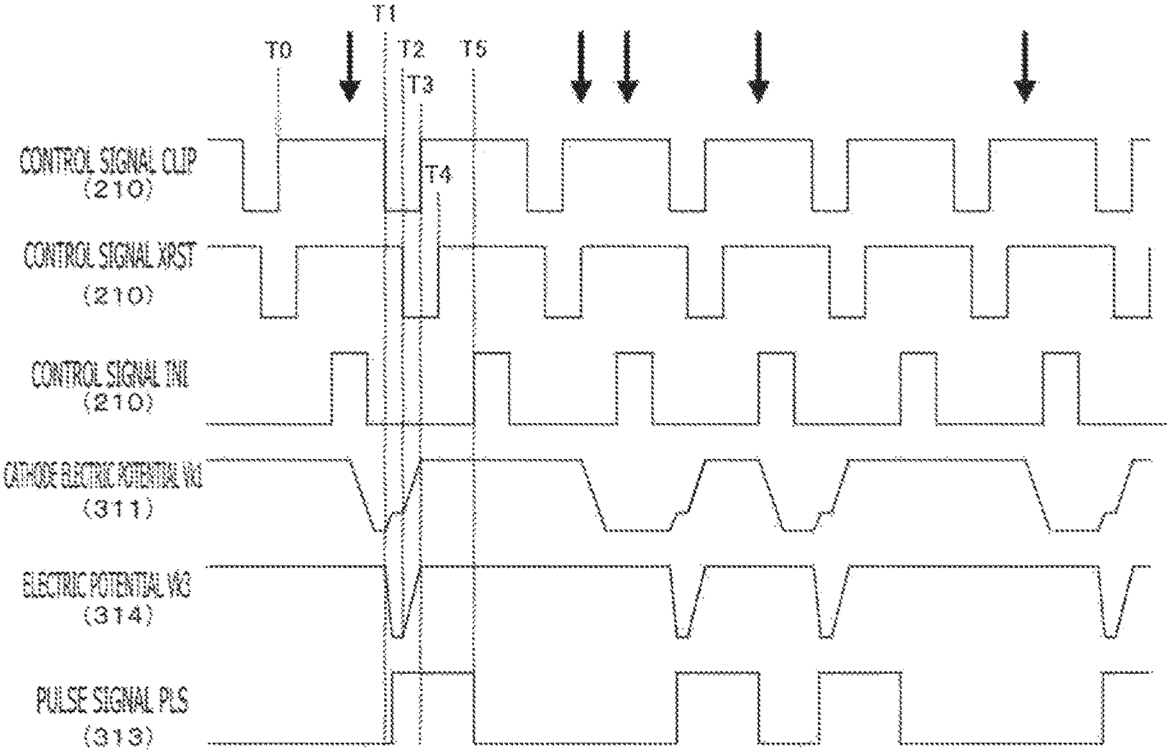
FIG. 13 is a timing chart for illustrating an example of the operation of the solid-state imaging element in the third embodiment of the present technology.

FIG. 13 is a timing chart for illustrating an example of the operation of the solid-state imaging element 200 in the third embodiment of the present technology. Also in the third embodiment, when the photon enters in the wait period from a timing T0 to a timing T1, the electric potential Vk3 of the detection node 314 decreases from the timing T1 to a timing T2, and hence, the pulse signal PLS rises.

Moreover, the cathode electric potential Vk1 and the electric potential Vk3 are recharged to the VDD by the control signal XRST at the low level from the timing T2 to a timing T3. Note that the detection circuit 330 is not initialized and the pulse signal PLS remains at the high level at this time, which is different from the first embodiment.

The control circuit 210 sets the control signal INI to the high level within a fixed period from a timing T5 after a timing T4 at which the control signal XRST reaches the high level. As a result, the pulse signal PLS returns to the low level.

A period from the timing T2 at which the control signal XRST reaches the low level to a timing T5 at which the control signal INI reaches the high level can freely be set. Thus, a pulse width of the pulse signal PLS can be extended to any value, and disappearance of the pulse (in other words, the detection omission of the photon) can be suppressed.

Moreover, the detection signal DET at a first stage of the detection circuit 330 can be fixed to the low level (such as the ground voltage) by the control signal INI at the high level in the wait period. As a result, it is possible to prevent a leak current due to a floating state, and hence, the false generation of the pulse signal (in other words, the false detection of the photon) can be suppressed.

Note that the second embodiment can also be applied to the third embodiment.

As described above, according to the third embodiment of the present technology, the control circuit 210 supplies the control signal INI to the detection circuit 330, and hence, the detection omission and the false detection of the photon can be suppressed.

4. Fourth Embodiment

In the third embodiment described above, the pMOS transistor 331 and the nMOS transistor 332 are serially inserted between the power supply voltage VDD and the ground voltage, but there is a risk in that a through-current and the false detection of the photon occur in this configuration. The solid-state imaging element 200 in a fourth embodiment is different from that in the first embodiment in such a point that a pMOS transistor 336 is added in the detection circuit 330.

Figure 14:
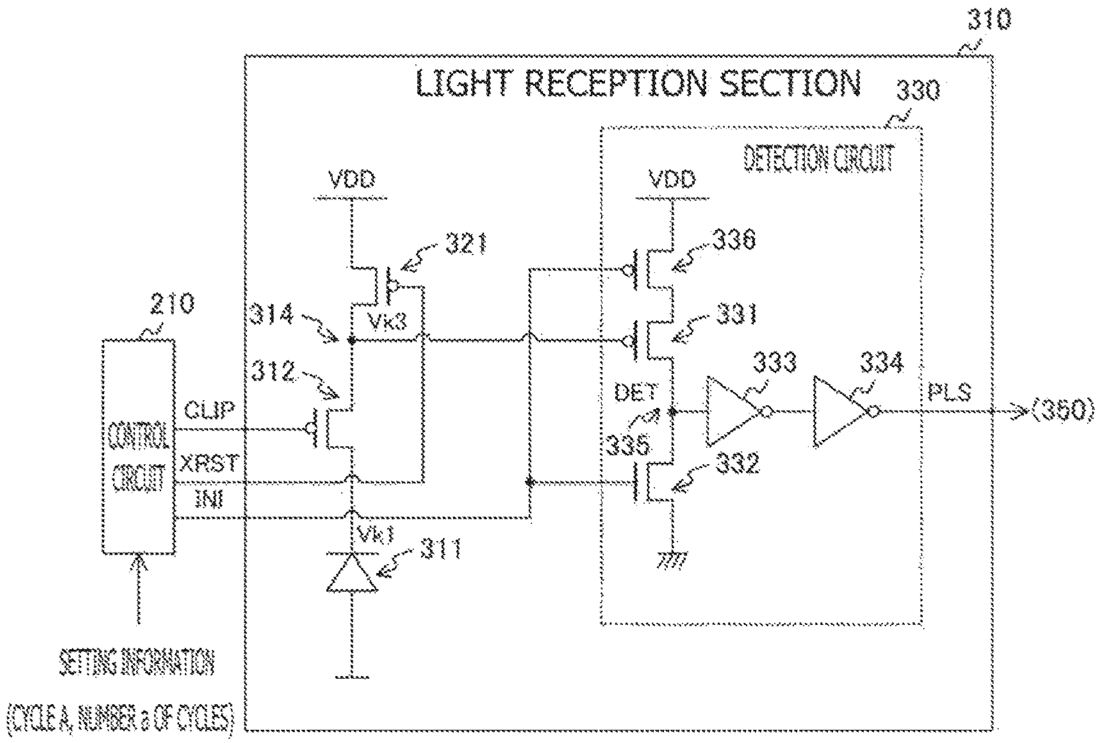
FIG. 14 is a circuit diagram for illustrating a configuration example of the light reception section in a fourth embodiment of the present technology.

FIG. 14 is a circuit diagram for illustrating a configuration example of the light reception section 310 in the fourth embodiment of the present technology. The detection circuit 330 in this fourth embodiment is different from that in the first embodiment in the point that the pMOS transistor 336 is inserted between the power supply voltage VDD and the pMOS transistor 331. The control signal INI is input to a gate of the pMOS transistor 336.

Note that the pMOS transistors 336 and 331 are examples of first and second pMOS transistors described in CLAIMS.

Figure 15:
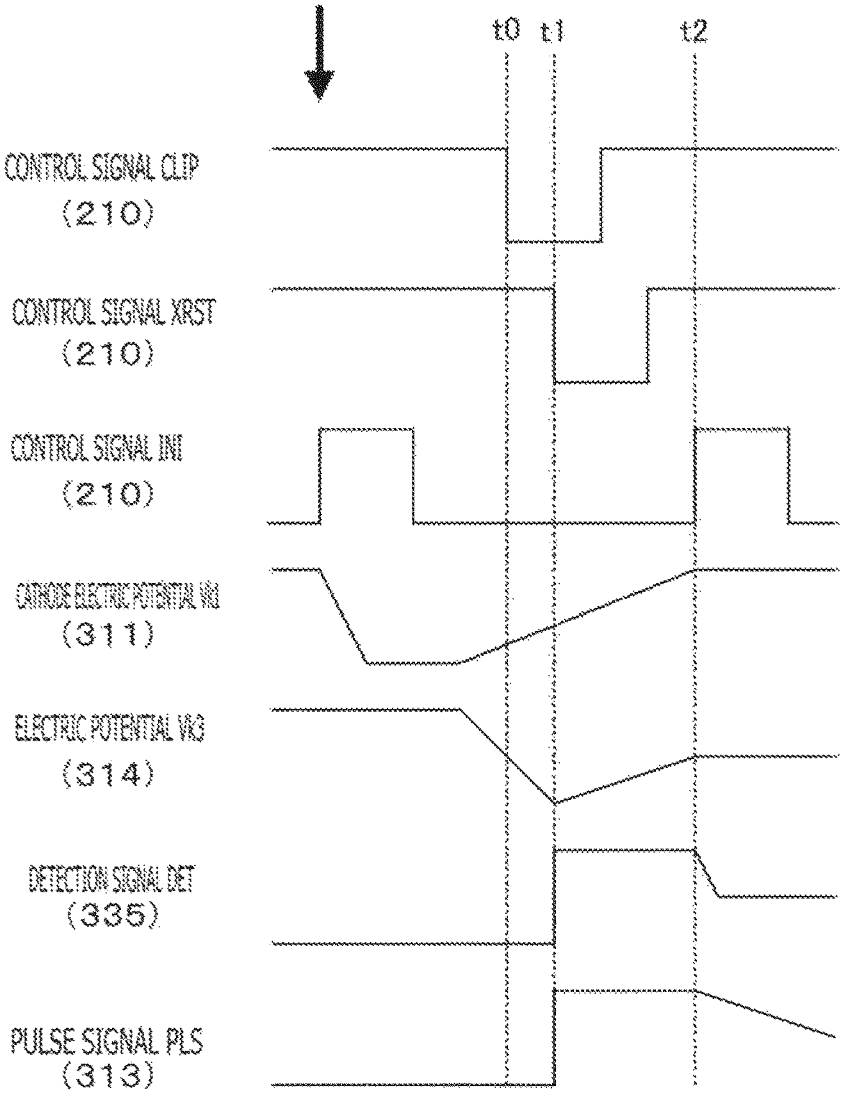
FIG. 15 is a timing chart for illustrating an example of the operation of the solid-state imaging element of a comparison target.

FIG. 15 is a timing chart for illustrating an example of the operation of the solid-state imaging element 200 in the third embodiment as a comparison target. As exemplified in this timing chart, after the elapse of the detection state from a timing t0 to a timing t1, the electric potential Vk3 of the detection node 314 is recharged by a timing t2. This period of the recharge may be insufficient, and hence, the electric potential Vk3 rises merely up to a value in a vicinity of a threshold value of the pMOS transistor 331 at the timing t2. When the detection circuit 330 is initialized at that timing, both the pMOS transistor 331 and the nMOS transistor 332 are put into the ON state, and hence, the through-current may flow or the photon may falsely be detected.

Figure 16:
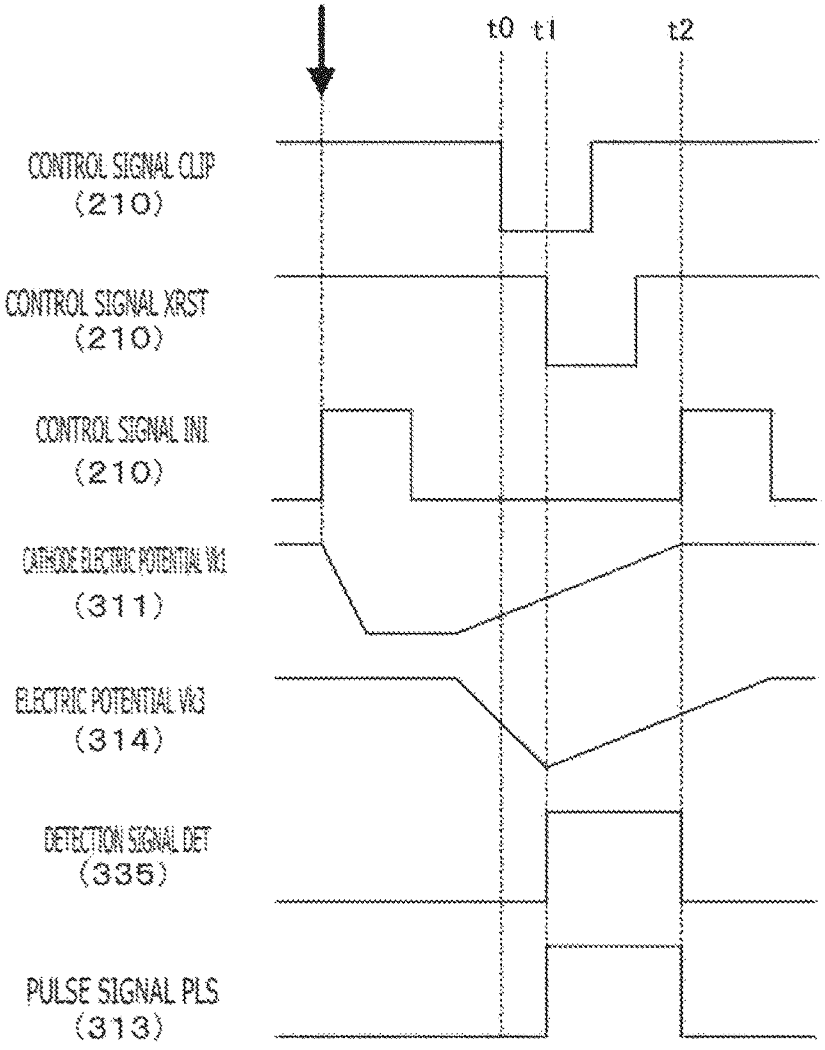
FIG. 16 is a timing chart for illustrating an example of the operation of the solid-state imaging element in the fourth embodiment of the present technology.

FIG. 16 is a timing chart for illustrating an example of the operation of the solid-state imaging element 200 in the fourth embodiment of the present technology. As a result of the insertion of the pMOS transistor 336, the pMOS transistor 336 disconnects the pMOS transistor 331 from the power supply voltage VDD and does not receive the input at the initialization time of the detection circuit 330 after the timing t2. Thus, the detection circuit 330 can certainly be initialized regardless of the state of the electric potential Vk3. As a result, the through-current and the false detection can be prevented. Moreover, the detection circuit 330 can be initialized during the recharge, and hence, the time of the recharge can easily be extended.

Note that the second embodiment can also be applied to the fourth embodiment.

As described above, according to the fourth embodiment of the present technology, the pMOS transistor 336 is inserted between the power supply voltage VDD and the pMOS transistor 331, and hence, the through-current and the false detection can be prevented.

5. Fifth Embodiment

In the first embodiment described above, withstand voltages of the transistors in the pixel 300 are unified, but it is difficult to further reduce the consumed electric power in this configuration. The solid-state imaging element 200 in a fifth embodiment is different from that in the first embodiment in such a point that a level shifter is added and the withstand voltages of some of the transistors are reduced.

Figure 17:
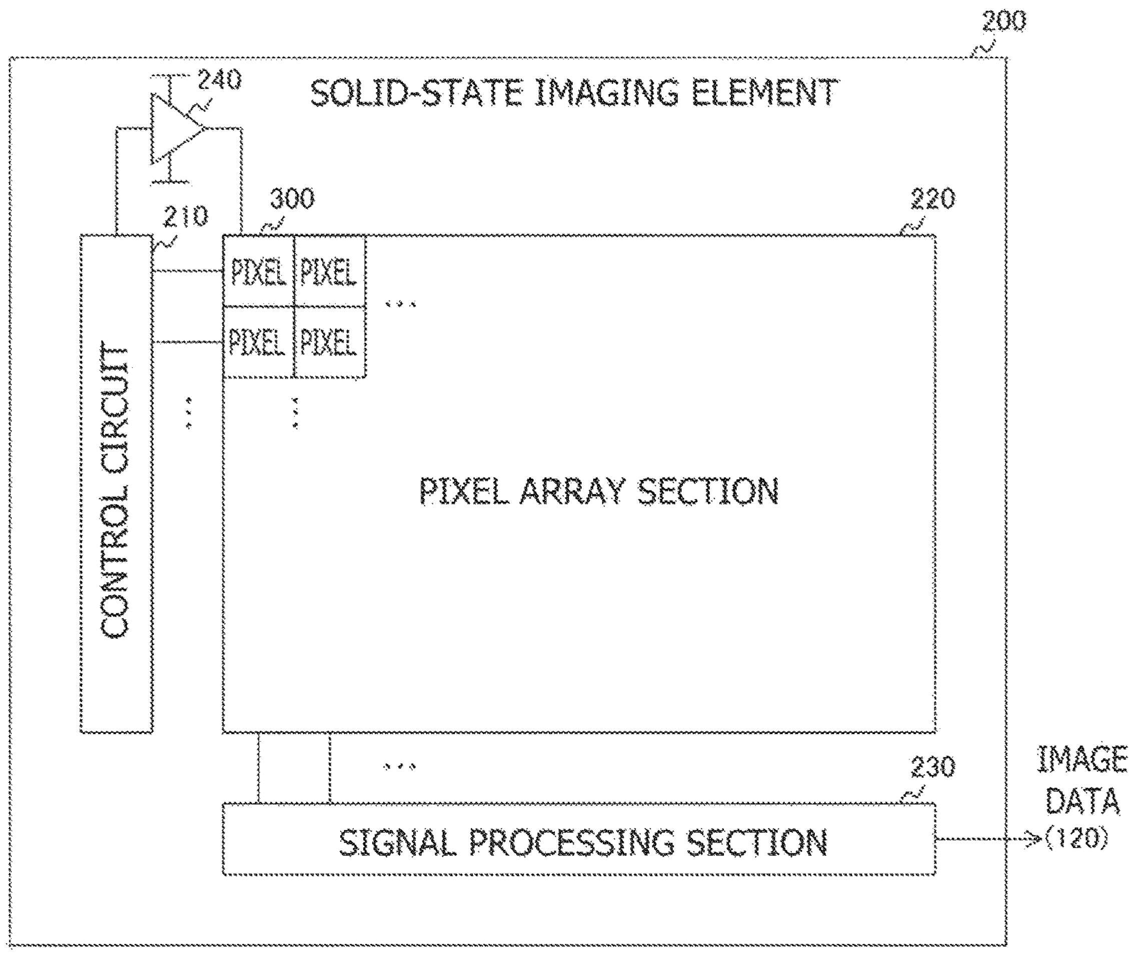
FIG. 17 is a block diagram for illustrating a configuration example of an operation of the solid-state imaging element in a fifth embodiment of the present technology.

FIG. 17 is a block diagram for illustrating a configuration example of the operation of the solid-state imaging element 200 in the fifth embodiment of the present technology. The solid-state imaging element 200 in this fifth embodiment is different from that in the first embodiment in such a point that the solid-state imaging element 200 further includes a level shifter 240. This level shifter 240 is shared by all of the pixels. Note that the level shifter 240 can be arranged for each row.

Figure 18:
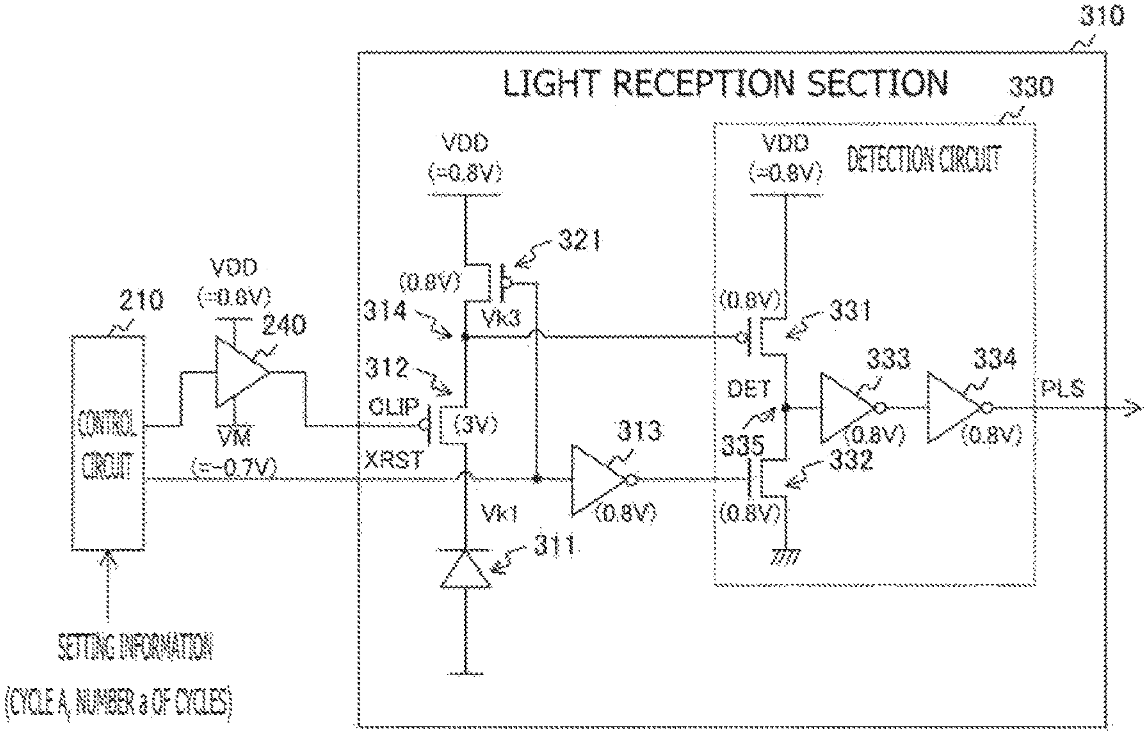
FIG. 18 is a circuit diagram for illustrating a configuration example of the light reception section in the fifth embodiment of the present technology.

FIG. 18 is a circuit diagram for illustrating a configuration example of the light reception section 310 in the fifth embodiment of the present technology. The level shifter 240 is inserted between the control circuit 210 and the clip transistor 312. This level shifter 240 changes the low level of the control signal CLIP and swings the control signal CLIP between the power supply voltage VDD and an intermediate electric potential VM.

Moreover, in the fifth embodiment, it is assumed that the power supply voltage VDD is 0.8 volts (V) and that the intermediate electric potential VM is −0.7 volts (V). It is assumed that the withstand voltage of the clip transistor 312 is 3 volts (V) and that the withstand voltages of the remaining transistors are 0.8 volts (V).

Figure 19:
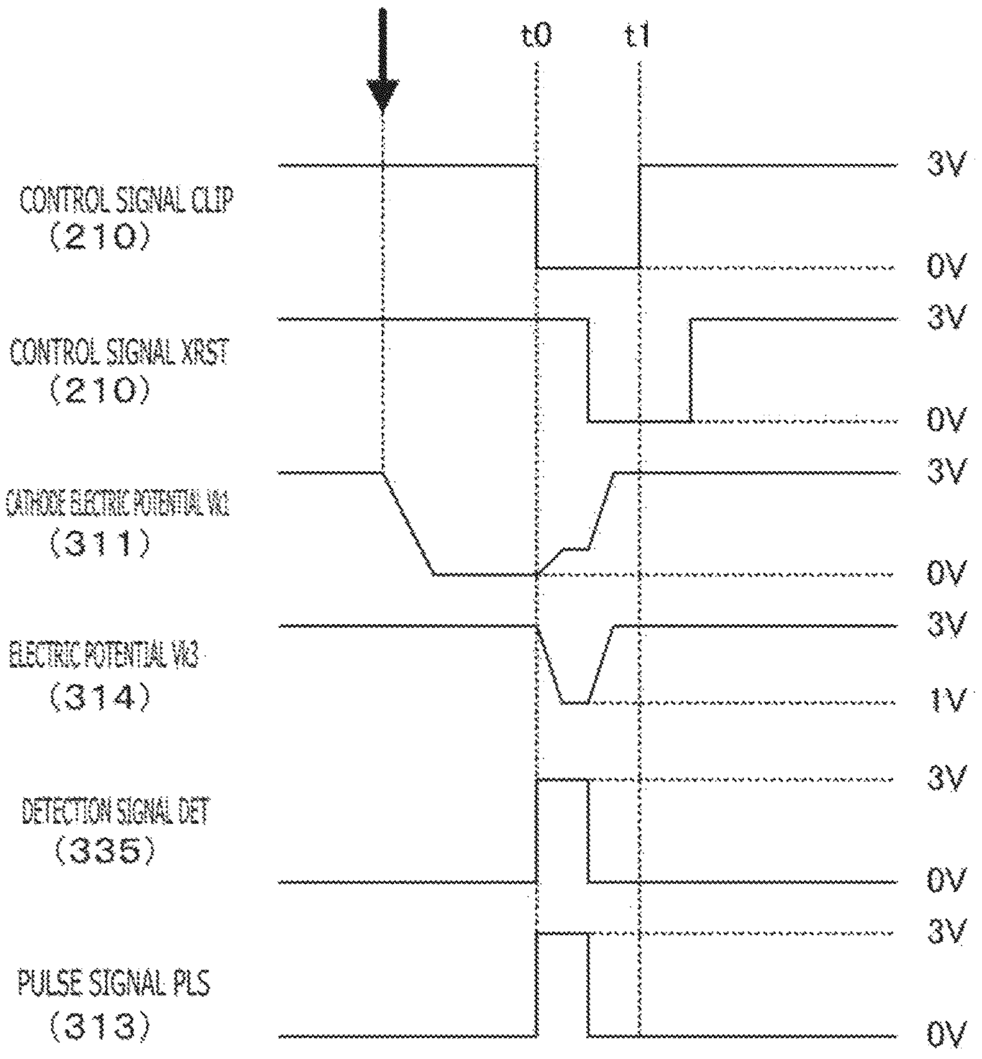
FIG. 19 is a timing chart for illustrating an example of the operation of the solid-state imaging element of a comparison target.

FIG. 19 is a timing chart for illustrating an example of the operation of the solid-state imaging element 200 in a comparison target without the level shifter 240. The configuration of the comparison target is similar to that of the fifth embodiment except for the point that the level shifter 240 is not provided.

As exemplified in this timing chart, it is assumed that the cathode electric potential Vk1 swings by 3 volts (V) in a period from a timing t0 to a timing t1. When a capacitance ratio between the cathode and the detection node 314 is 2:1, the electric potential Vk3 of the detection node 314 swings by 2 volts (V). In this case, the transistors having the withstand voltage of 0.8 volts (V) are broken.

Figure 20:
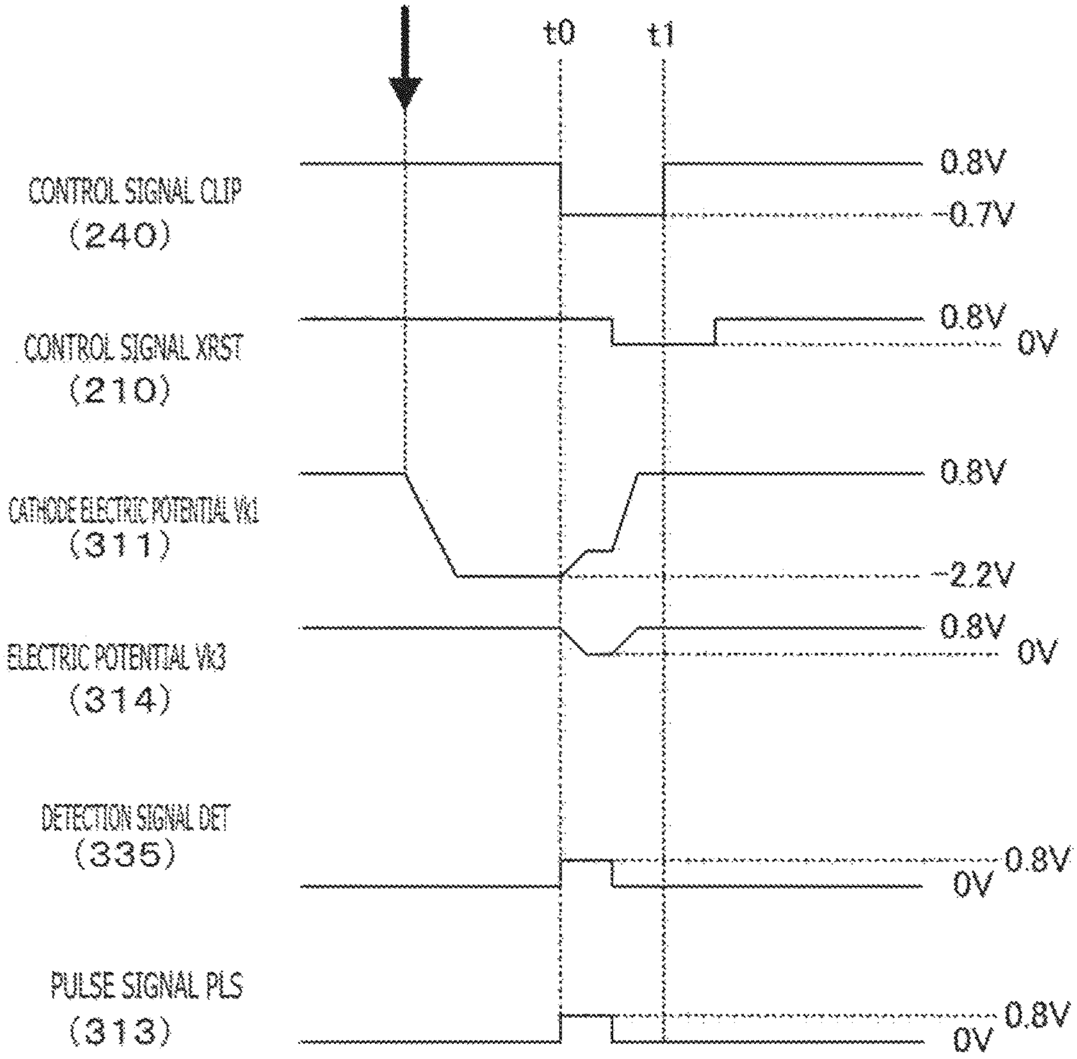
FIG. 20 is a timing chart for illustrating an example of the operation of the solid-state imaging element in the fifth embodiment of the present technology.

FIG. 20 is a timing chart for illustrating an example of the operation of the solid-state imaging element 200 in the fifth embodiment of the present technology. As described before, when the level shifter 240 is provided, the low level of the control signal CLIP is −0.7 volts (V). As a result, as exemplified in this timing chart, it is possible to cause the electric potential Vk3 to decrease merely low to 0 volts in a period from a timing t0 to a timing t1. Thus, it is possible to limit the swing of the voltage Vk3 to 0.8 volts (V), and hence, the transistors having the withstand voltage of 0.8 volts (V) are no longer broken. A circuit subsequent to the recharge transistor 321 can be a low-voltage circuit by use of the transistors having such a low withstand voltage, and hence, the consumed electric power can be reduced.

Note that each of the second, third, and fourth embodiments can also be applied to the fifth embodiment.

As described above, according to the fifth embodiment of the present technology, the level shifter 240 changes the level of the control signal CLIP, and hence, the circuit subsequent to the recharge transistor 321 can be the low-voltage circuit. As a result, the consumed electric power can be reduced.

6. Sixth Embodiment

In the fifth embodiment described above, only the recharge transistor 321 executes the recharge, but there is a risk in that a recharge period varies in this configuration. The solid-state imaging element 200 in a sixth embodiment is different from that in the first embodiment in such a point that a recharge transistor is added.

Figure 21:
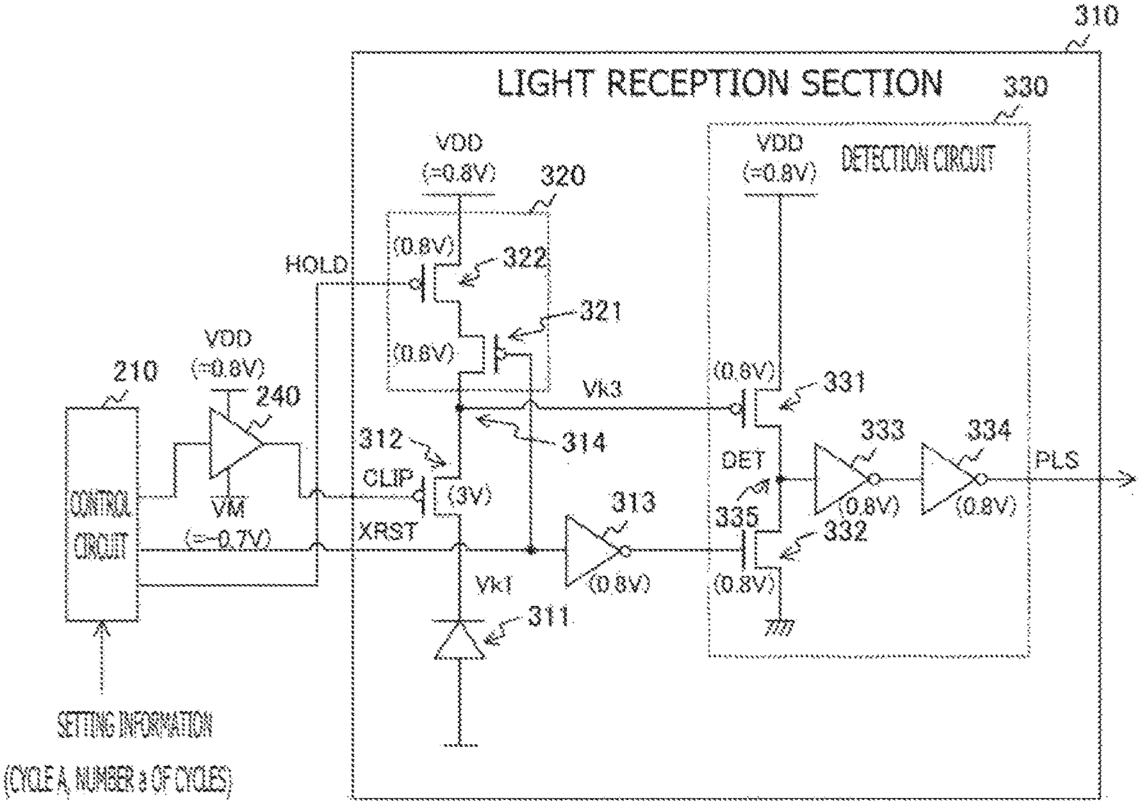
FIG. 21 is a circuit diagram for illustrating a configuration example of the light reception section in a sixth embodiment of the present technology.

FIG. 21 is a circuit diagram for illustrating a configuration example of the light reception section 310 in the sixth embodiment of the present technology. The light reception section 310 in this sixth embodiment is different from that in the fifth embodiment in such a point that the light reception section 310 further includes a recharge transistor 322. As the recharge transistor 322, for example, a pMOS transistor is used.

The recharge transistors 321 and 322 are serially connected between the power supply voltage VDD and the detection node 314. Moreover, a control signal HOLD is input from the control circuit 210 to a gate of the recharge transistor 322. A circuit including the recharge transistors 321 and 322 is referred to as a recharge section 320.

Figure 22:
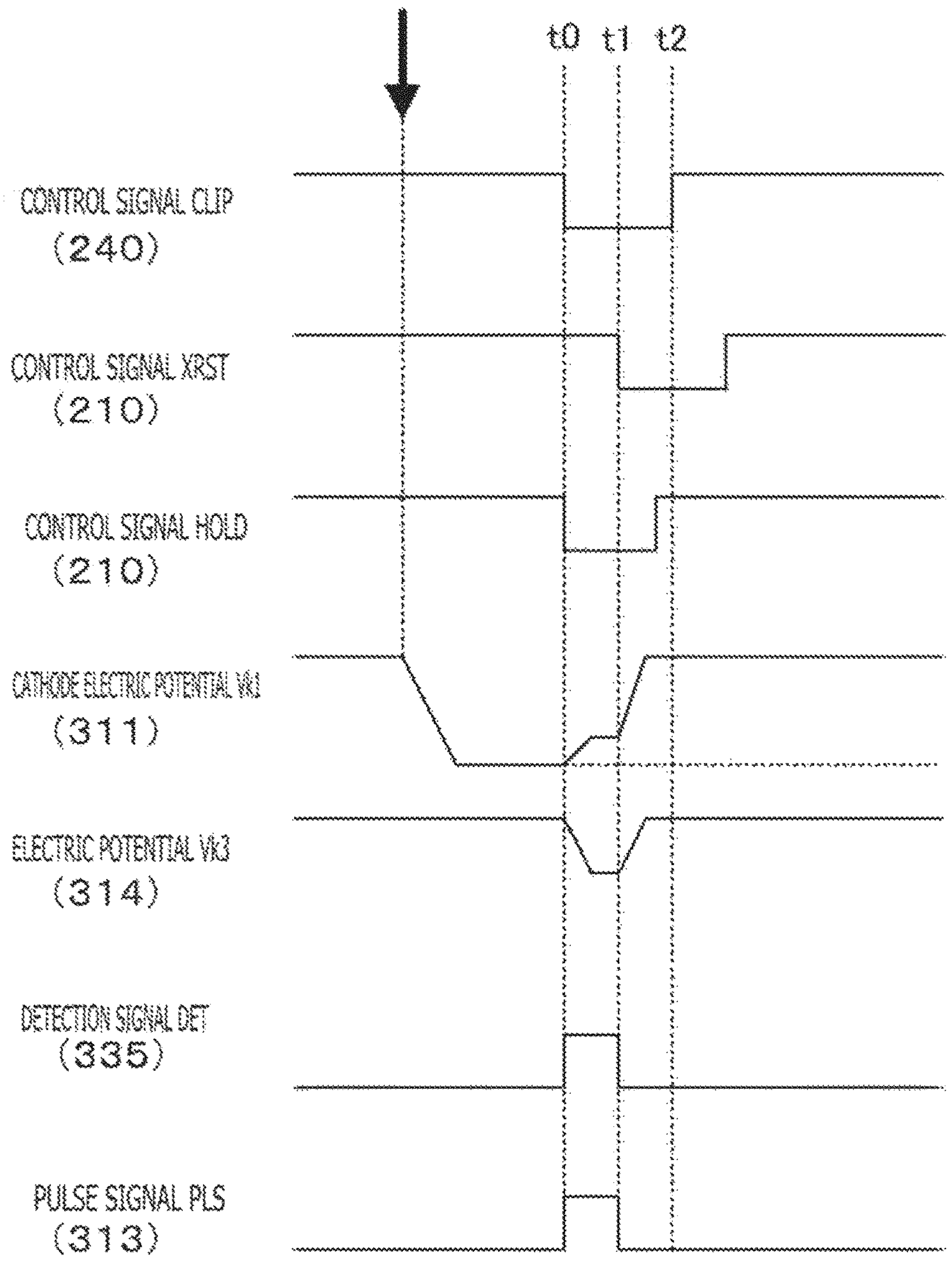
FIG. 22 is a timing chart for illustrating one example of the operation of the solid-state imaging element in the sixth embodiment of the present technology.

FIG. 22 is a timing chart for illustrating an example of the operation of the solid-state imaging element 200 in the sixth embodiment of the present technology.

In the fifth embodiment described above, the recharge period is from the fall of the control signal XRST to the fall of the control signal CLIP. However, in this configuration, the respective swings of the control signals XRST and CLIP are different, and the gate electric potentials of the used transistors are different. Thus, the threshold voltages vary, characteristics such as the temperature are greatly different from one another, and hence, the variation of the recharge period increases. Control exemplified in this timing chart is executed in order to suppress this variation of the recharge period.

In this timing chart, such a point that the cathode electric potential Vk1 falls when the photon enters, the electric potential Vk3 decreases when the control signal CLIP reaches the low level at a timing t0, and the detection circuit 330 detects the photon is the same as that in the fifth embodiment.

In the sixth embodiment, the control circuit 210 sets the control signal HOLD to the low level at the timing t0 before the start of the recharge, to thereby be in a preparation state for the execution of the recharge. As a result, when the control signal XRST falls at a timing t1, the recharge is started immediately.

After this timing t1, the control circuit 210 sets the control signal HOLD to the high level, thereby finishing the recharge. At a timing t2 after the end of the recharge, the control circuit 210 returns the control signal CLIP to the high level to be in the wait state and then returns the control signal XRST to the high level.

As a result of the control exemplified in this timing chart, the recharge period is from the fall of the control signal XRST to the rise of the control signal HOLD, and the gate electric potentials of the recharge transistors 321 and 322 used for the recharge are the same electric potential. Thus, compared with the fifth embodiment in which the gate electric potentials of the transistors used for the recharge are different from each other, the variation of the recharge period can be suppressed.

Note that each of the second and third embodiments can also be applied to the sixth embodiment.

Figure 23:
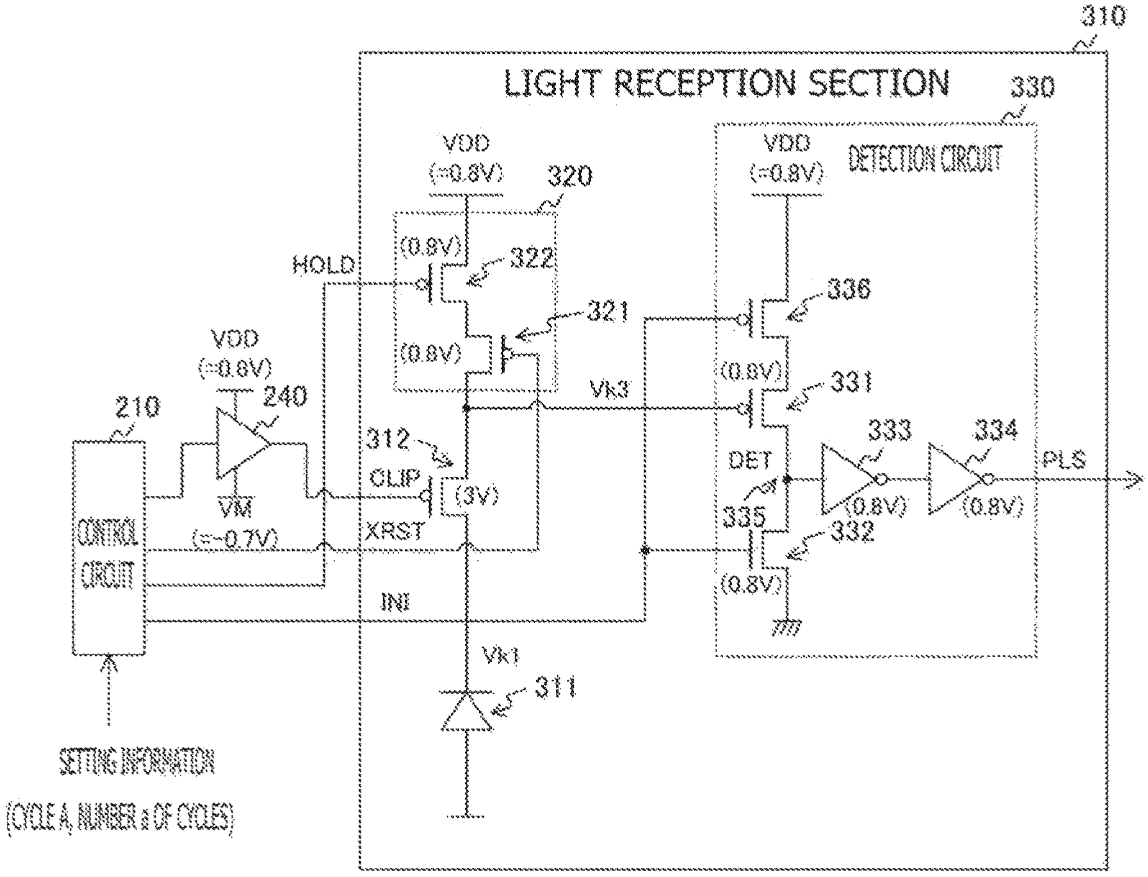
FIG. 23 is a circuit diagram for illustrating a configuration example of the light reception section in a case in which the fourth embodiment is applied to the sixth embodiment of the present technology.
Figure 24:
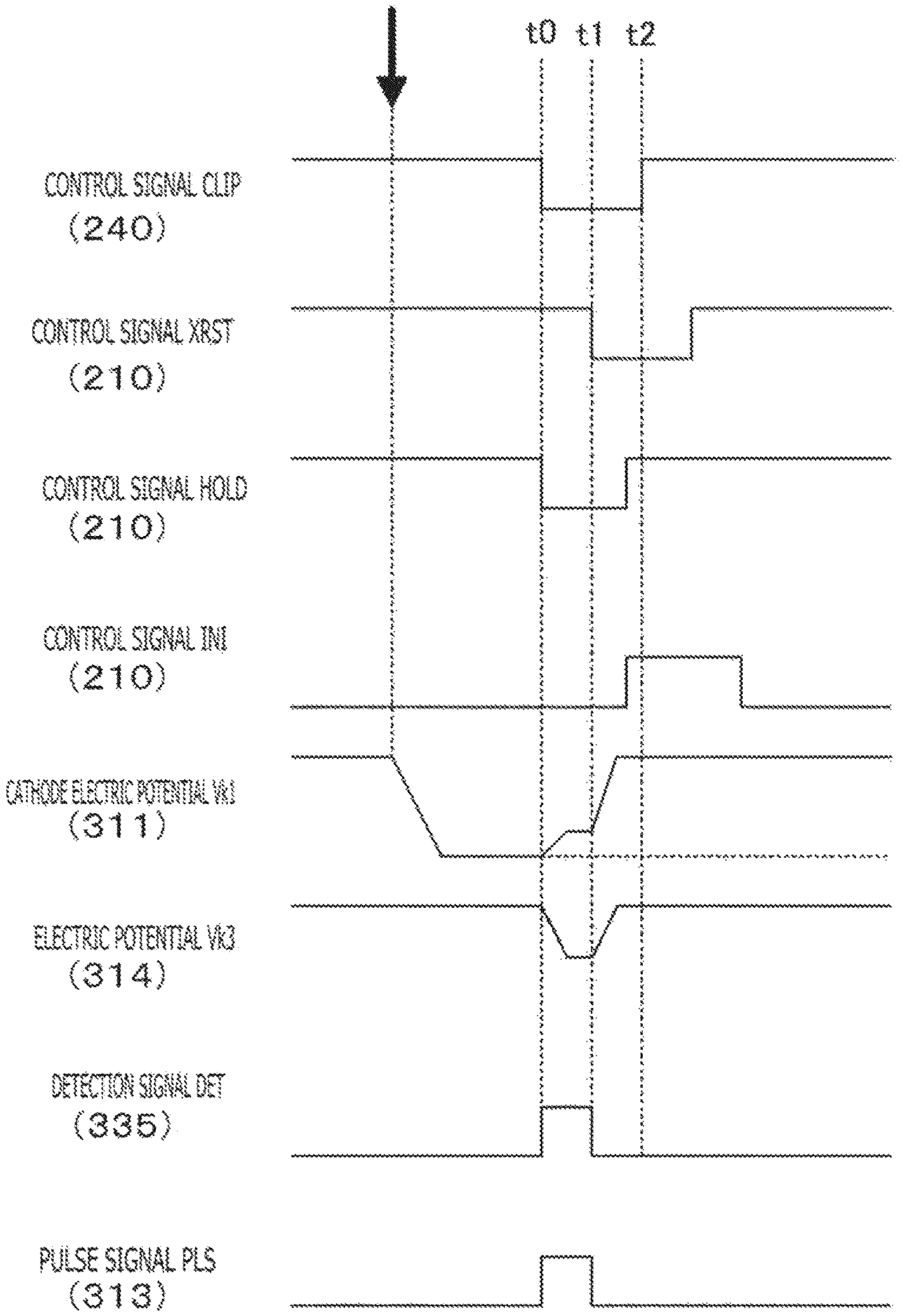
FIG. 24 is a timing chart for illustrating one example of the operation of the solid-state imaging element in a case in which the fourth embodiment is applied to the sixth embodiment of the present technology.

Moreover, as exemplified in FIG. 23, the fourth embodiment can also be applied to the sixth embodiment. In this case, control exemplified in FIG. 24 is executed. As described before in the fourth embodiment, even when the electric potential Vk3 varies in the period in which the control signal CLIP is at the low level and hence the recharge is not being executed, the through-current does not flow during the resetting of the detection circuit 330.

As described above, according to the sixth embodiment of the present technology, the recharge section 320 including the serially connected recharge transistors 321 and 322 executes the recharge, and hence the variation of the recharge period can be suppressed.

7. Seventh Embodiment

In the first embodiment described above, the start timings of the connection period and the recharge are unified for each row so as to be the same, but an IR drop occurs in this configuration, and hence, there is a risk in that the control signals cannot be transmitted and the sufficient recharge is not executed. The solid-state imaging element 200 in this seventh embodiment is different from that in the first embodiment in such a point that the start timings of the connection period and the recharge are controlled to be different from one another among the rows.

Figure 25:
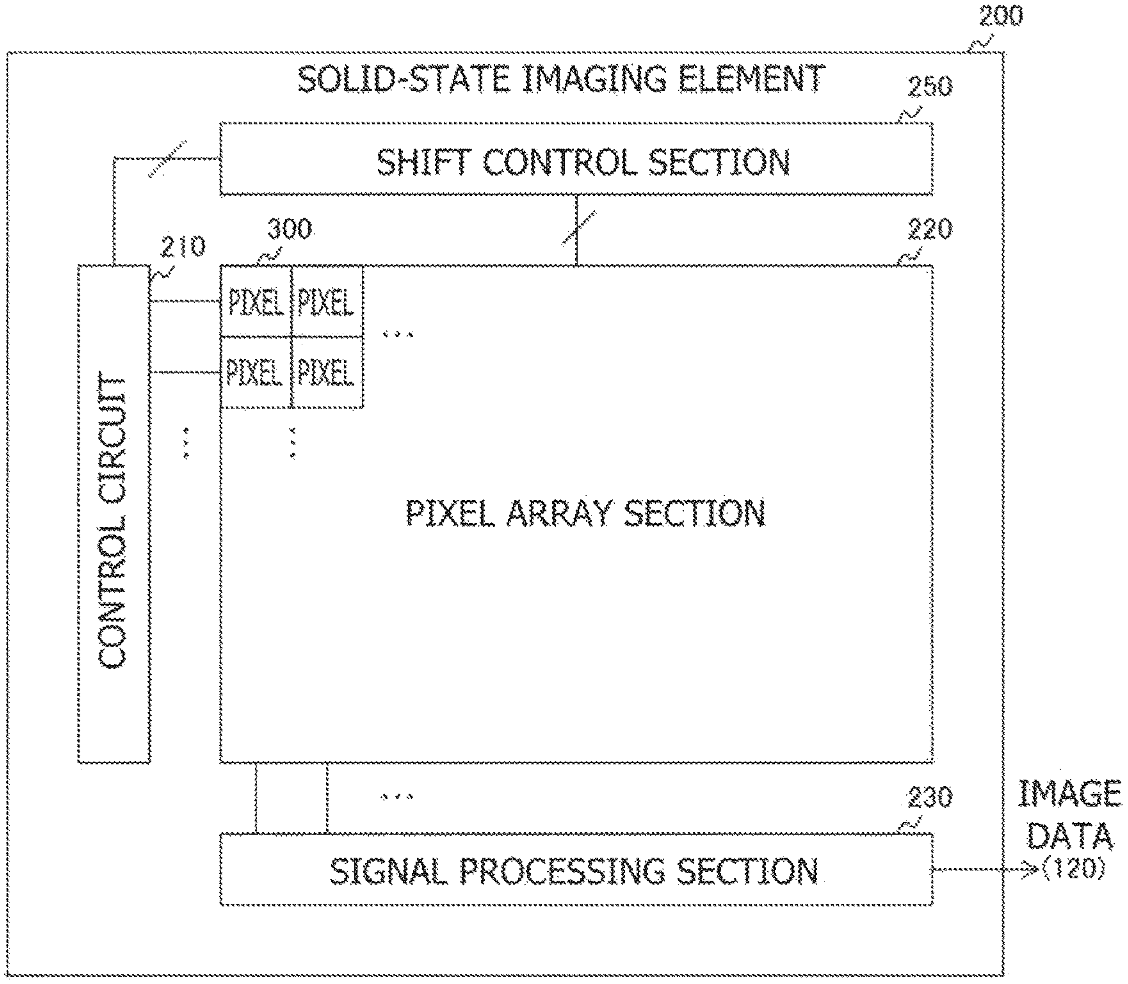
FIG. 25 is a block diagram for illustrating a configuration example of the solid-state imaging element in a seventh embodiment of the present technology.

FIG. 25 is a block diagram for illustrating a configuration example of the solid-state imaging element 200 in the seventh embodiment of the present technology. The solid-state imaging element 200 in this seventh embodiment is different from that in the first embodiment in such a point that the solid-state imaging element 200 further includes a shift control section 250.

Figure 26:
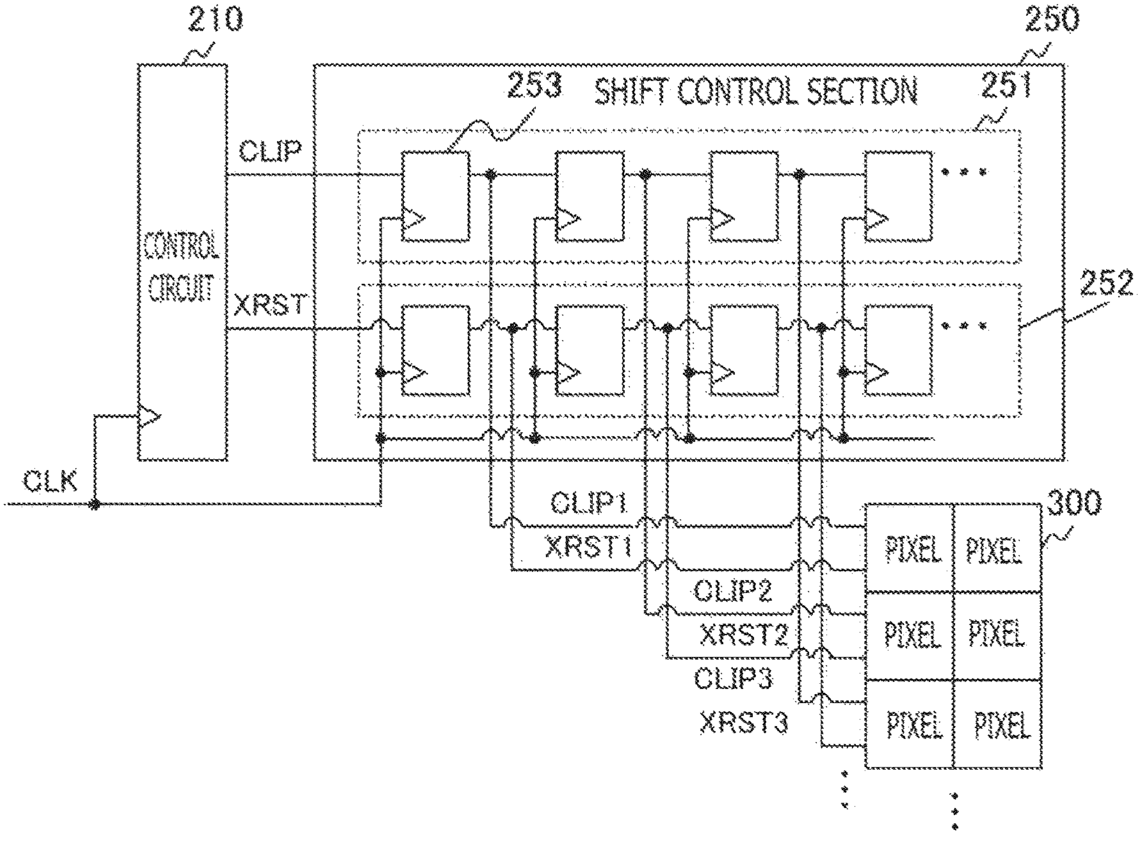
FIG. 26 is a block diagram for illustrating a configuration example of a shift control section in the seventh embodiment of the present technology.

FIG. 26 is a block diagram for illustrating a configuration example of the shift control section 250 in the seventh embodiment of the present technology. The shift control section 250 in this seventh embodiment includes shift registers 251 and 252. Each of the shift registers 251 and 252 includes a plurality of stages of a flipflop 253.

The control circuit 210 inputs the control signal CLIP to a first stage of the shift register 251 and inputs the control signal XRST to a first stage of the shift register 252.

Output of the flipflop 253 at an n-th ("n" is an integer) stage in the shift register 251 is input to an n+1-th stage. Moreover, this output at the n-th stage is supplied, as a control signal CLIPn, to the n-th row.

Output of the flipflop 253 at an n-th ("n" is an integer) stage in the shift register 252 is input to an n+1-th stage. Moreover, this output at the n-th stage is supplied, as a control signal XRSTn, to the n-th row.

As exemplified in this block diagram, the phases of the control signals CLIP and XRST are changed row by row by supplying output of the shift registers 251 and 252 at each stage to the corresponding row.

A description is now given of a problem of the first embodiment for comparison with the seventh embodiment.

Figure 27:
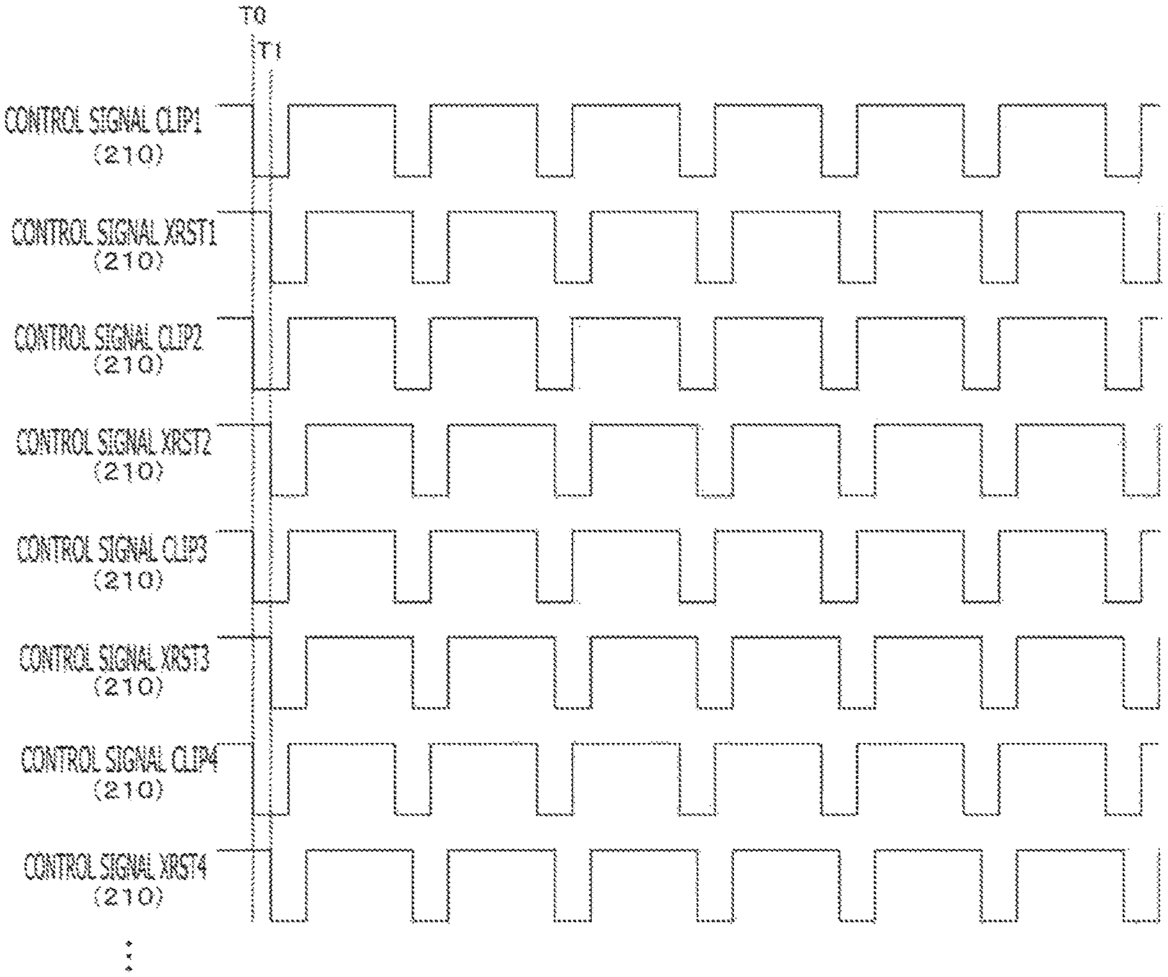
FIG. 27 is a timing chart for illustrating an example of the operation of the solid-state imaging element of a comparison target.

FIG. 27 is a timing chart for illustrating an example of the operation of the solid-state imaging element in the first embodiment as a comparison target. As exemplified in this timing chart, the control signals CLIP such as control signals CLIP1 and CLIP2 for the respective rows fall at the same timing such as a timing T0. The control signals XRST such as control signals XRST1 and XRST2 also fall at the same timing such as a timing T1. The fall of the control signals CLIP corresponds to the start timing of the connection period, and the fall of the control signals XRST corresponds to the start timing of the recharge. As exemplified in this timing chart, when the start timings are unified so as to be the same on these rows, the IR drop occurs, and hence, there is a risk in that the control signals cannot be transmitted and the sufficient recharge is not executed.

Figure 28:
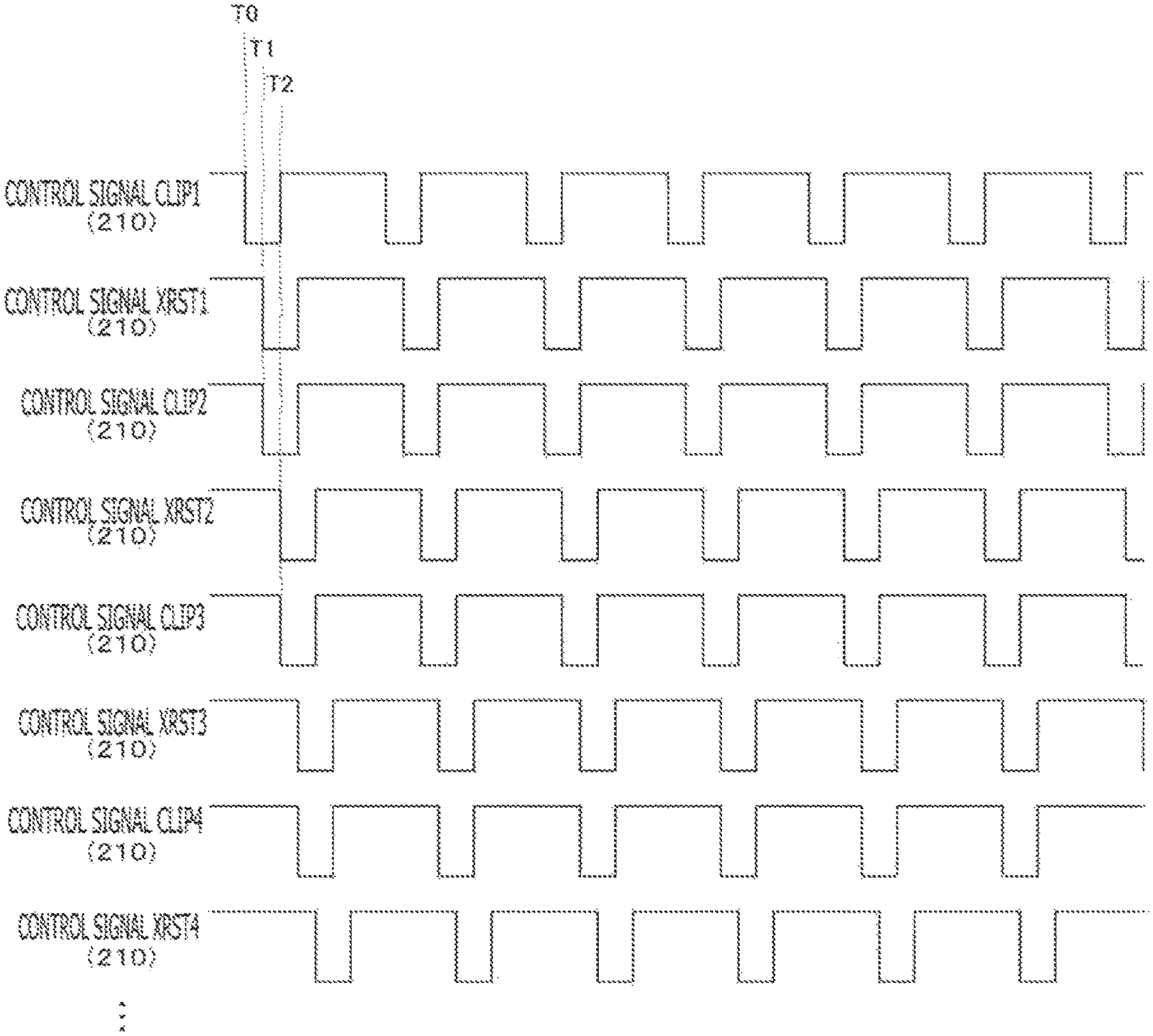
FIG. 28 is a timing chart for illustrating an example of the operation of the solid-state imaging element in the seventh embodiment of the present technology.

FIG. 28 is a timing chart for illustrating an example of the operation of the solid-state imaging element 200 in the seventh embodiment of the present technology. As described before, the output of the shift registers 251 and 252 at each stage is supplied to the corresponding row, and hence, the phases of the control signals CLIP and XRST are changed row by row.

For example, the control signal CLIP1 for the first row falls at a timing T0, and the control signal CLIP2 for the second row falls at a timing T1. Moreover, the control signal XRST1 for the first row falls at the timing T1, and the control signal XRST2 for the second row falls at a timing T2.

As exemplified in this timing chart, the phases of the control signals CLIP and XRST vary row by row, and hence, the start timings of the connection period and the recharge vary row by row. With this configuration, the IR drop can be suppressed.

Note that the row is set to a unit area and the phases of the control signals are shifted unit area by unit area, but the phases of the control signals can also be shifted unit area by unit area other than the row (such as a rectangular area or the column).

Moreover, the order of the shift of the phase is set to the order of the row, for example, the second row falls after the first row falls, but the configuration is not limited to this example.

Figure 29:
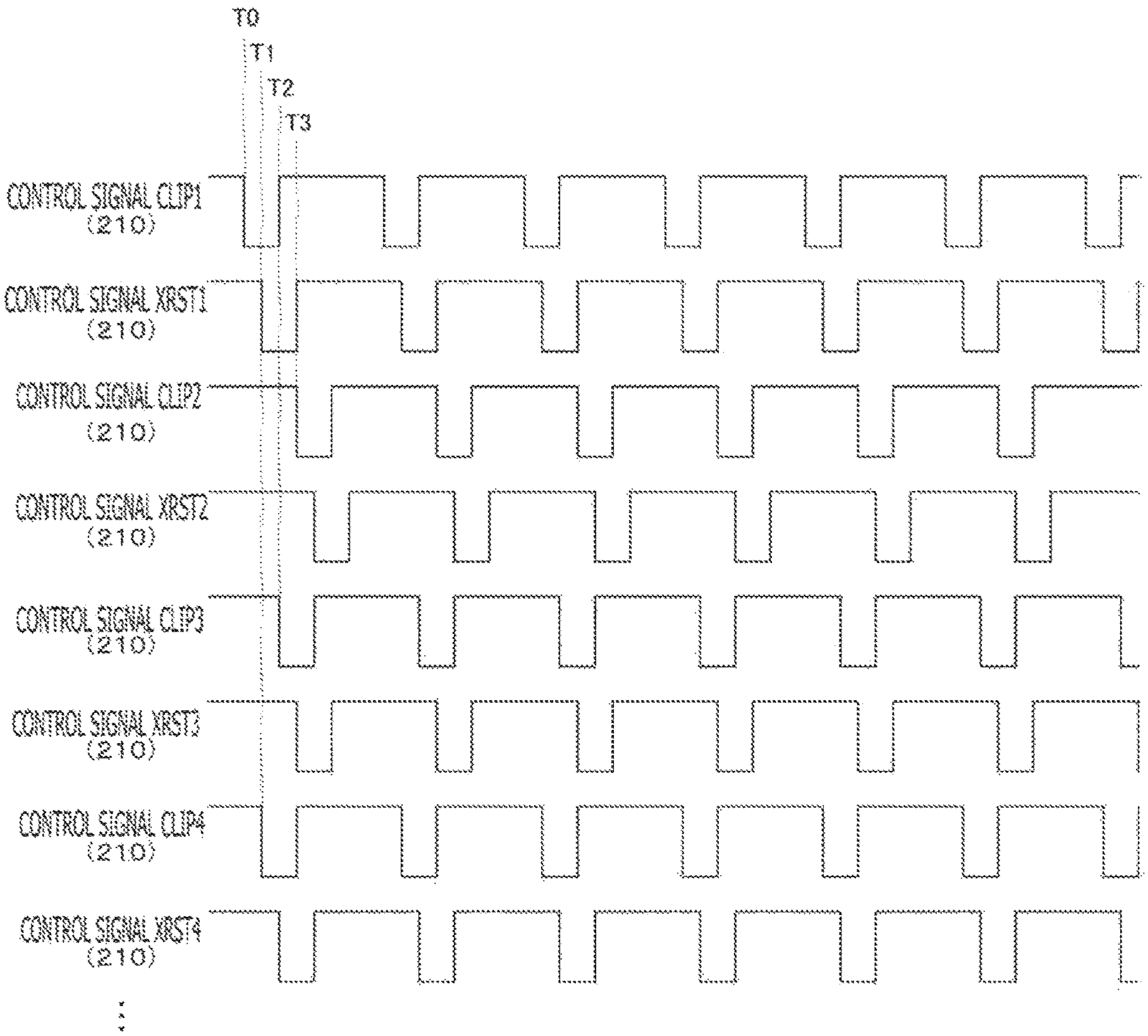
FIG. 29 is a timing chart for illustrating another example of the operation of the solid-state imaging element in the seventh embodiment of the present technology.

For example, as exemplified in FIG. 29, random numbers may be generated in advance, and the order of the shift of the phase can randomly be set on the basis of the random numbers. In this timing chart, for example, the control signal CLIP1 falls at a timing T0, and a control signal CLIP4 falls at a timing T1. Moreover, a control signal CLIP3 falls at a timing T2, and the control signal CLIP2 falls at a timing T3.

Note that each of the second to sixth embodiments can also be applied to the seventh embodiment.

As described above, according to the seventh embodiment of the present technology, the phases of the control signals are shifted row by row, and hence, the IR drop can be suppressed.

Modification Example

In the seventh embodiment described above, the phases of the control signals are shifted by the shift register external to the control circuit 210, but the control circuit 210 can also supply control signals shifted in phase row by row. The solid-state imaging element 200 in a modification example of the seventh embodiment is different from that in the seventh embodiment in such a point that the control circuit 210 supplies the control signals shifted in phase row by row.

Figure 30:
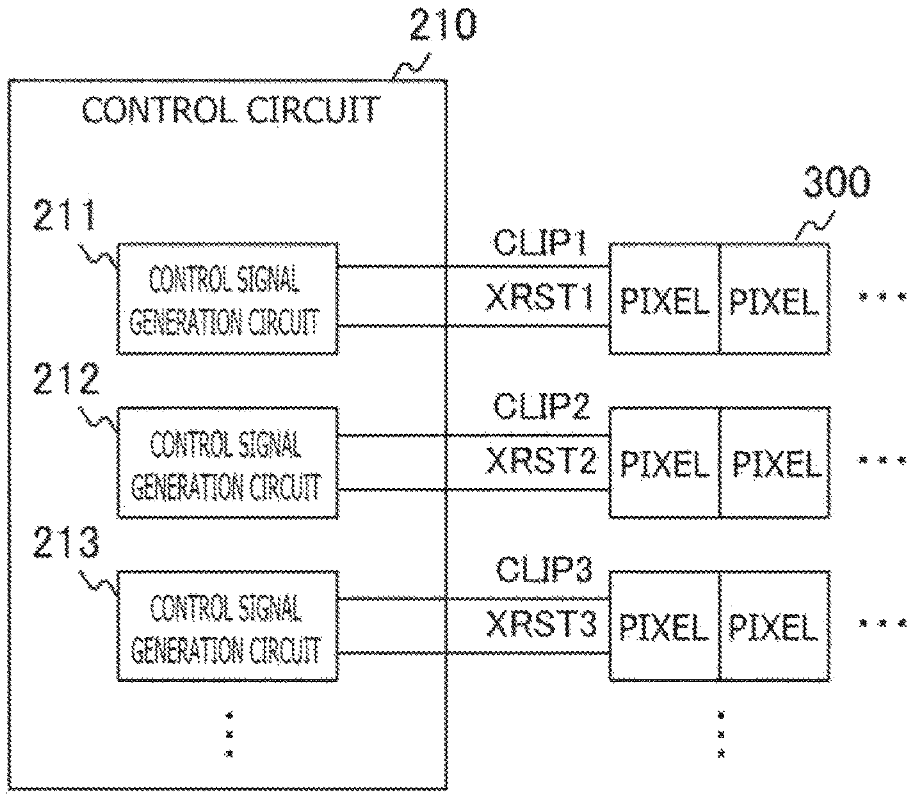
FIG. 30 is a block diagram for illustrating a configuration example of a control circuit in a modification example of the seventh embodiment of the present technology.

FIG. 30 is a block diagram for illustrating a configuration example of the control circuit 210 in the modification example of the seventh embodiment of the present technology. The control circuit 210 in this modification example of the seventh embodiment includes control signal generation circuits such as control signal generation circuits 211, 212, and 213 each provided for each row. Each of the control signal generation circuit 211 and the like generates the control signals CLIP and XRST for the corresponding row. Note that it is assumed that the control signals vary in phase row by row.

As described above, according to the modification example of the seventh embodiment of the present technology, the control circuit 210 supplies the control signals shifted in phase row by row, and hence, the shift register is eliminated.

8. Eighth Embodiment

In the first embodiment described above, the circuits inside the solid-state imaging element 200 are arranged on a single semiconductor substrate, but it is difficult to reduce a circuit scale and an area of each pixel in this configuration. The solid-state imaging element 200 in an eighth embodiment is different from that in the first embodiment in such a point that a stacked structure is employed.

Figure 31:
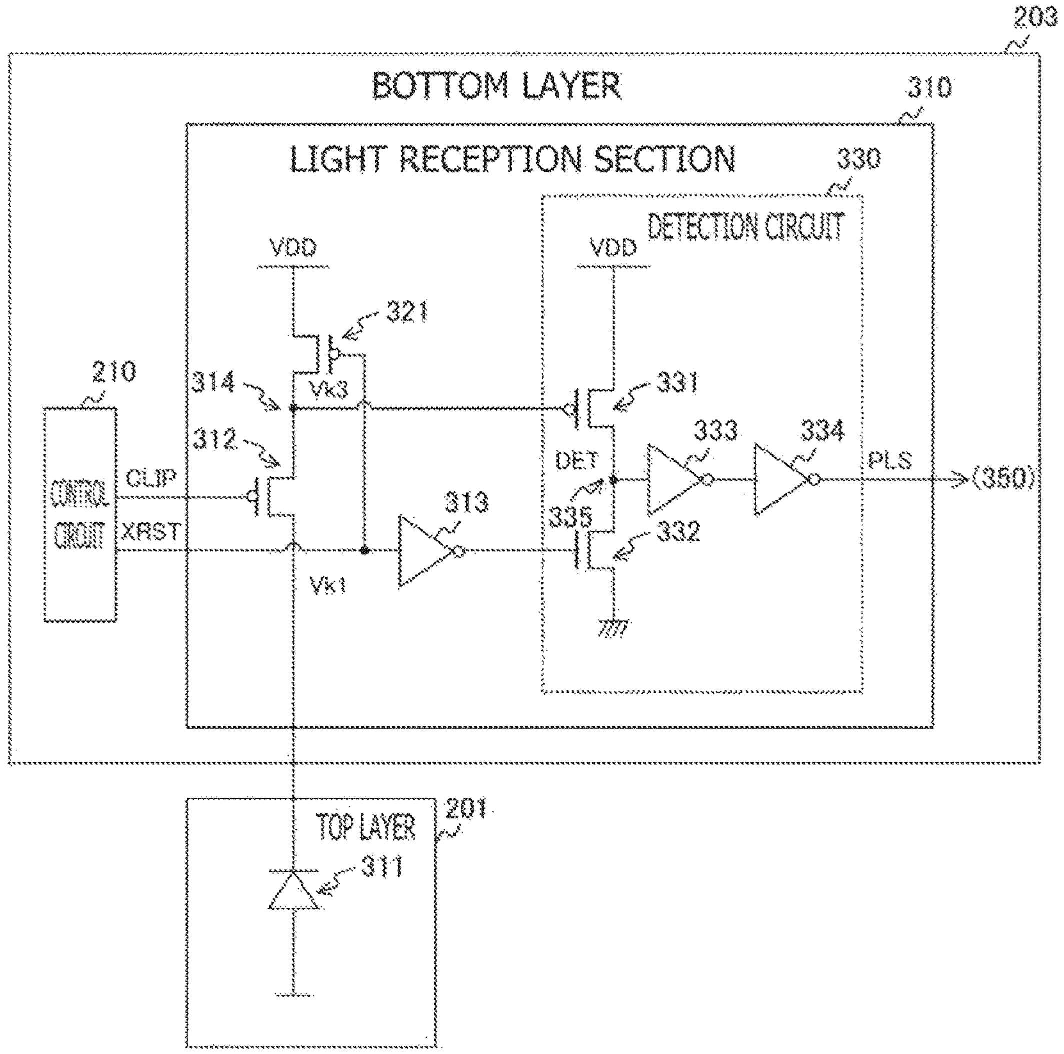
FIG. 31 is a circuit diagram for illustrating a configuration example of the solid-state imaging element in an eighth embodiment of the present technology.

FIG. 31 is a circuit diagram for illustrating a configuration example of the solid-state imaging element 200 in the eighth embodiment of the present technology. The solid-state imaging element in this eighth embodiment includes stacked top layer 201 and bottom layer 203. These top layer 201 and bottom layer 203 are formed into semiconductor substrates (chips) different from each other. These chips are electrically connected to each other through, for example, Cu—Cu bonding. Note that the connection can be achieved through a via or a bump in addition to the Cu—Cu bonding.

In the top layer 201, the SPAD 311 is arranged for each pixel. In the bottom layer 203, the circuits (such as the control circuit 210 and the light reception section 310) other than the SPAD 311 are arranged.

As exemplified in this circuit diagram, the circuit scale and the area for each pixel can be reduced through the stack structure.

Note that each of the second to seventh embodiments can also be applied to the eighth embodiment.

As described above, according to the eighth embodiment of the present technology, the circuits are arranged so as to be distributed to the top layer 201 and the bottom layer 203, and hence, it is possible to reduce the circuit scale and the area of each pixel.

First Modification Example

In the eighth embodiment described above, only the SPAD 311 is arranged in the top layer 201, but it is difficult to reduce the circuit scale of the bottom layer 203 in this configuration. The solid-state imaging element 200 in a first modification example of the eighth embodiment is different from that in the eighth embodiment in such a point that the transistor is further arranged in the top layer 201.

Figure 32:
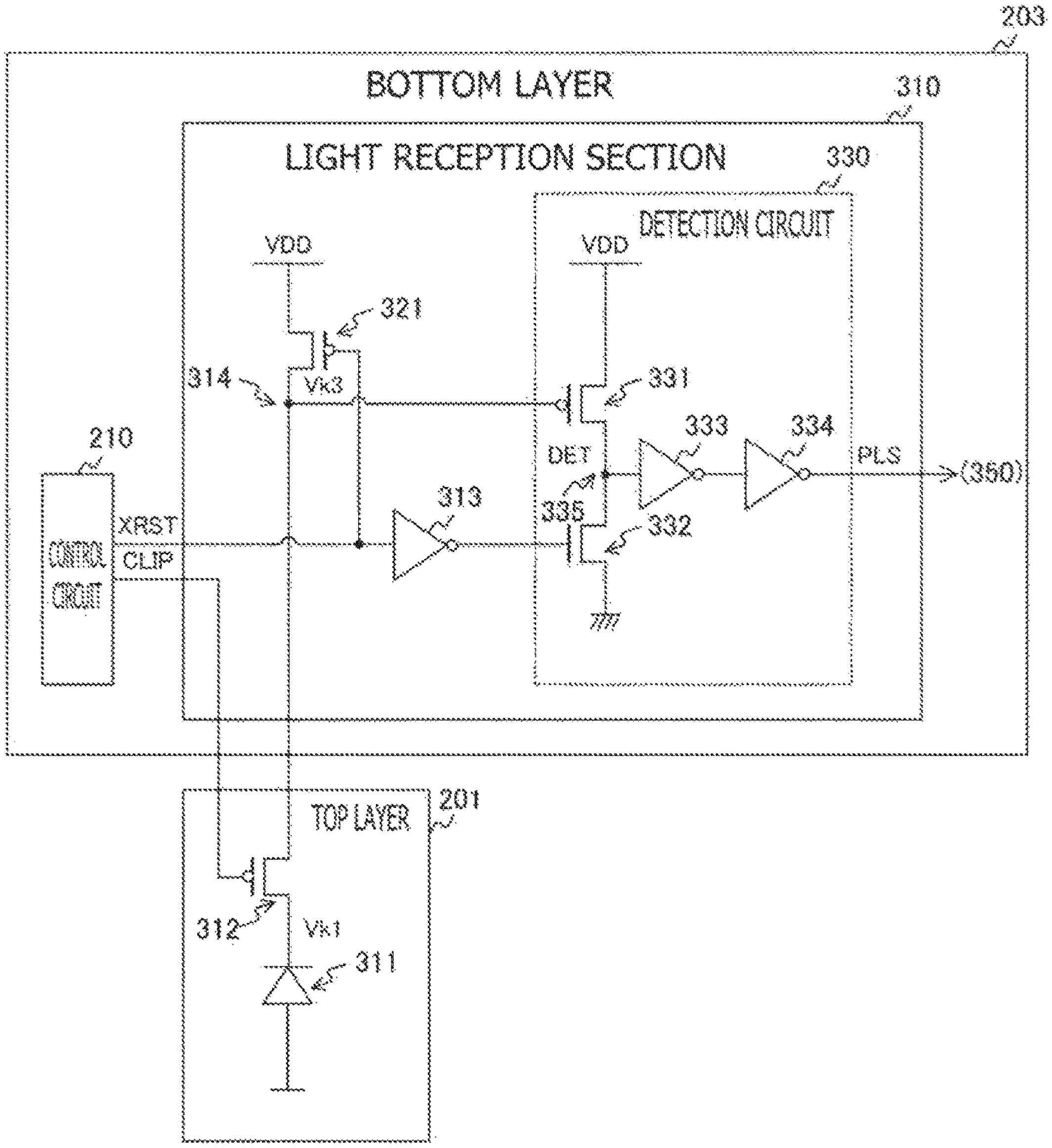
FIG. 32 is a circuit diagram for illustrating a configuration example of the solid-state imaging element in a first modification example of the eighth embodiment of the present technology.

FIG. 32 is a circuit diagram for illustrating a configuration example of the solid-state imaging element 200 in the first modification example of the eighth embodiment of the present technology. The solid-state imaging element in this first modification example of the eighth embodiment is different from that in the eighth embodiment in such a point that the clip transistor 312 is further arranged in the top layer 201.

With the stack structure exemplified in this circuit diagram, wiring between the cathode and the clip transistor 312 does not bridge between the layers, and hence, the capacitance of the cathode can be reduced. Moreover, the consumed electric power of the SPAD 311 is proportional to the capacitance of the cathode, and hence, the consumed electric power can be reduced through the reduction of the capacitance.

Note that each of the second to seventh embodiments can also be applied to the first modification example of the eighth embodiment. In particular, when the fifth or the sixth embodiment is applied, it is possible to eliminate the clip transistor 312 having the high withstand voltage from the bottom layer 203. In general, when a transistor having a high withstand voltage and a transistor having a low withstand voltage are arranged, a fixed distance is required therebetween. Thus, an effect of reducing the area can be expected more than an effect of reducing the number of transistors in the bottom layer 203 by providing the clip transistor 312 having the high withstand voltage in the top layer 201.

As described above, according to the first modification example of the eighth embodiment of the present technology, the clip transistor 312 is further arranged in the top layer 201, and hence, the circuit scale and the area of the bottom layer 203 can further be reduced.

Second Modification Example

In the eighth embodiment described above, only the SPAD 311 is arranged in the top layer 201, but it is difficult to reduce the circuit scale of the bottom layer 203 in this configuration. The solid-state imaging element 200 in a second modification example of the eighth embodiment is different from that in the eighth embodiment in such a point that a three-layer structure is employed.

Figure 33:
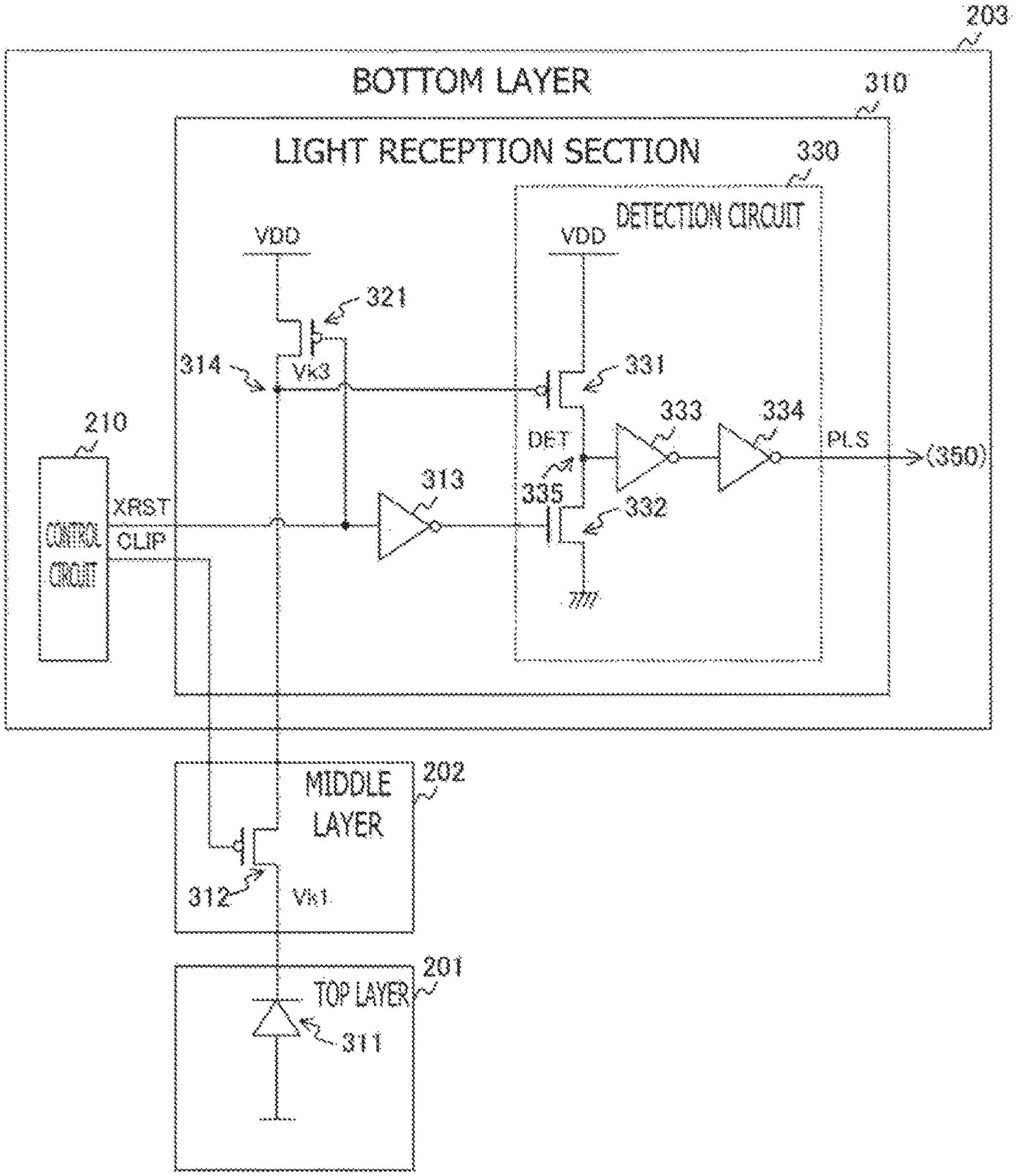
FIG. 33 is a circuit diagram for illustrating a configuration example of the solid-state imaging element in a second modification example of the eighth embodiment of the present technology.

FIG. 33 is a circuit diagram for illustrating a configuration example of the solid-state imaging element 200 in the second modification example of the eighth embodiment of the present technology. The solid-state imaging element in this second modification example of the eighth embodiment further includes a middle layer 202. For example, the stacked top layer 201 and the middle layer 202 are formed in one of the two semiconductor substrates, and the bottom layer 203 is formed in the other one thereof. The clip transistor 312 is arranged in the middle layer 202.

As exemplified in this circuit diagram, a degree of design freedom of the clip transistor 312 arranged in the middle layer 202 increases, and hence, a transistor having an appropriate characteristic can be used in addition to achieving the area reduction effect by employing the three-layer structure.

Note that each of the second to seventh embodiments can also be applied to the second modification example of the eighth embodiment.

As described above, according to the second modification example of the eighth embodiment of the present technology, the circuits are arranged so as to be distributed to the three layers, and hence, it is possible to further reduce the circuit scale and the area of each pixel.

9. Ninth Embodiment

In the first embodiment described above, the count value of the counter 350 is read, but it is difficult to further increase the maximum value of a countable number of pulses in this configuration. The solid-state imaging element 200 in a ninth embodiment is different from that in the first embodiment in such a point that the count value of the counter 350 is extended.

Figure 34:
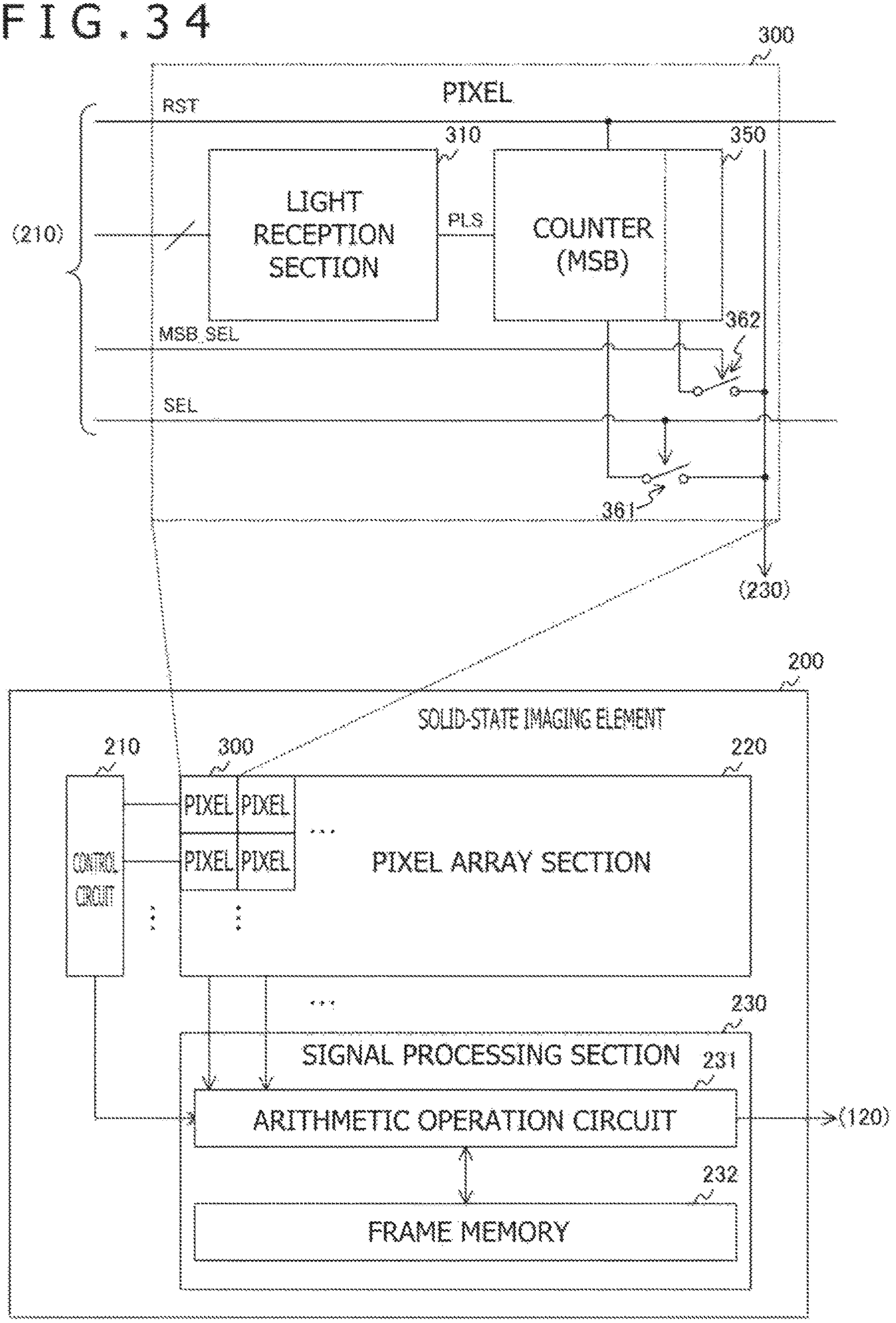
FIG. 34 is a block diagram for illustrating a configuration example of the solid-state imaging element in a ninth embodiment of the present technology.

FIG. 34 is a block diagram for illustrating a configuration example of the solid-state imaging element 200 in the ninth embodiment of the present technology. In the solid-state imaging element 200 according to this ninth embodiment, a selection switch 362 is further arranged in the pixel 300. Moreover, the signal processing section 230 includes an arithmetic operation circuit 231 and a frame memory 232.

The selection switch 362 supplies the MSB (Most Significant Bit) of a bit string representing the count value to the signal processing section 230 according to a selection signal MSB_SEL from the control circuit 210.

The arithmetic operation circuit 231 executes predetermined arithmetic operation on the basis of the bit string and the MSB of each row. Details of a content of the arithmetic operation are described later. The frame memory 232 holds a result of the arithmetic operation of the arithmetic operation circuit 231.

Figure 35:
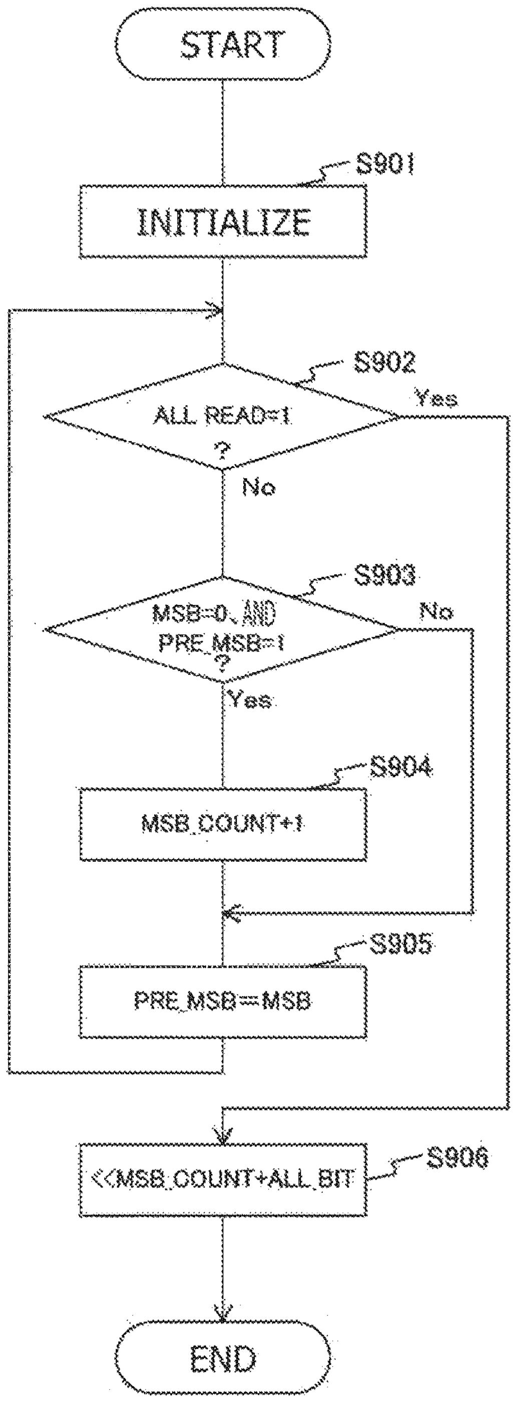
FIG. 35 is a flowchart for illustrating an example of the operation of the arithmetic operation circuit in the ninth embodiment of the present technology.

FIG. 35 is a flowchart for illustrating an example of the operation of the arithmetic operation circuit 231 in the ninth embodiment of the present technology. This operation starts after the end of the exposure.

In this state, PRE_MSB, MSB_COUNT, and ALL_BIT are held in the frame memory 232 for each pixel. PRE_MSB indicates a value of a previous MSB. MSB_COUNT indicates the number of times of a change of the MSB from 1 to 0, in other words, the number of times of overflow of the counter 350. ALL_BIT indicates the bit string read out from the counter 350. It is assumed that the counter 350 in the ninth embodiment continues the count after the overflow.

The arithmetic operation circuit 231 initializes each of PRE_MSB, MSB_COUNT, and ALL_BIT for each pixel to "0" (Step S901). The arithmetic operation circuit 231 determines whether or not a control signal ALL_READ from the control circuit 210 is "1" (Step S902). This control signal ALL_READ indicates whether or not read processing has been completed. In the ninth embodiment, the control circuit 210 reads the count value for each pixel for multiple times. When the plurality of times of the read of the count value has been completed, the ALL_READ is set to "1."

When the control signal ALL_READ is not "1" (No in Step S902), the arithmetic operation circuit 231 focuses on any pixel and determines whether or not the MSB for this time of this pixel is "0" and PRE_MSB is "1" (Step S903). The change in MSB from 1 to 0 indicates the occurrence of the overflow of the counter 350.

When the MSB for this time is "0" and the PRE_MSB is "1" (Yes in Step S903), the arithmetic operation circuit 231 increments MSB_COUNT for the focused pixel (Step S904).

When the MSB for this time is "1" or PRE_MSB is "0" (No in Step S903) or after Step S904, the arithmetic operation circuit 231 updates PRE_MSB to the MSB for the current time (Step S905) and repeats the steps subsequent to Step S902.

When the control signal ALL_READ is "1" (Yes in Step S902), the arithmetic operation circuit 231 reads ALL_BIT for each pixel, executes shift by an amount of the corresponding MSB_COUNT, and adds a result of the shift to ALL_BIT (Step S906). After Step S906, the arithmetic operation circuit 231 finishes the operation for the read.

As exemplified in this flowchart, the arithmetic operation circuit 231 adds the value obtained by the shift by the same number as the number of times of the overflow (MSB_COUNT) of the counter 350 and the bit string indicating the count value to each other. As a result, a counter extending the count value to the upper side can be implemented.

Figure 36:
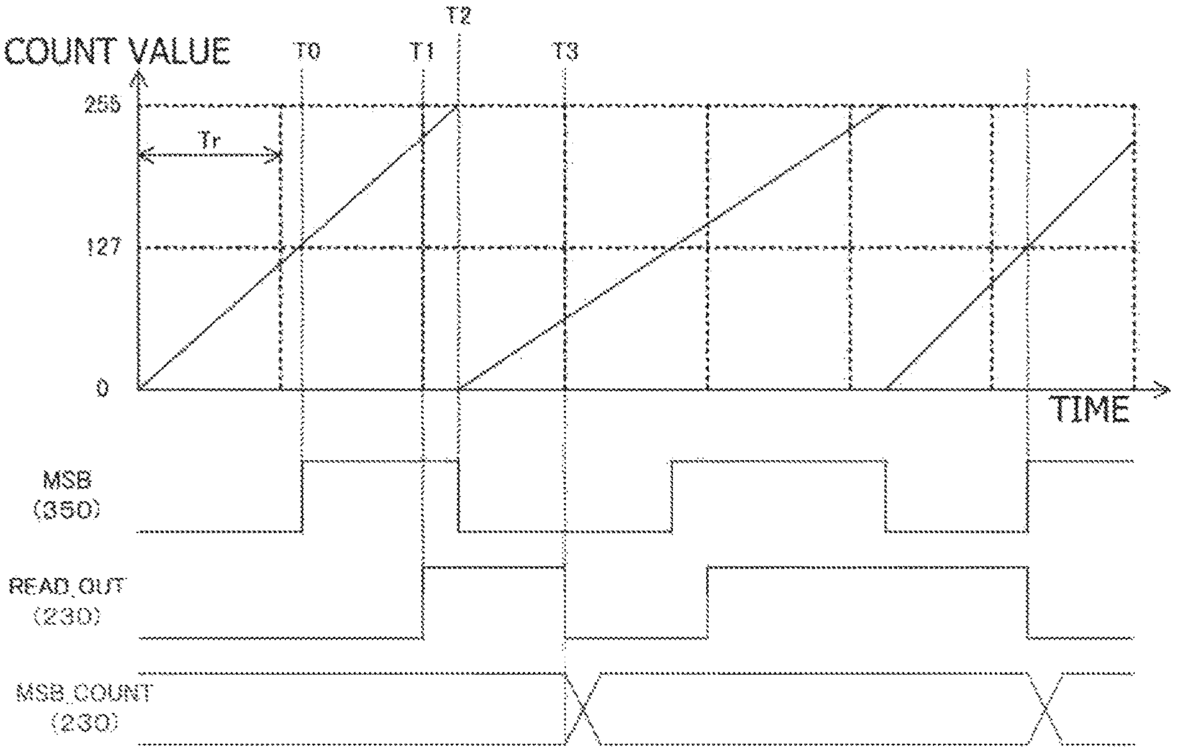
FIG. 36 is a timing chart for illustrating an example of the operation of the solid-state imaging element in the ninth embodiment of the present technology.

FIG. 36 is a flowchart for illustrating an example of the operation of the arithmetic operation circuit 231 in the ninth embodiment of the present technology. The arithmetic operation circuit 231 reads the count values of all of the pixels each time a predetermined cycle Tr elapses. This cycle Tr is set to such a time that the count value of the counter 350 does not exceed ½ of the maximum countable value. READ_OUT is a flag indicating whether or not the count value is being read.

When the MSB changes from 0 to 1 at a timing T0 in a certain cycle, the arithmetic operation circuit 231 reads the count value at a timing T1 at which this cycle has elapsed. When the MSB changes from 1 to 0 at a timing T2 in the next cycle (that is, the counter 350 overflows), the arithmetic operation circuit 231 updates the MSB_COUNT at a timing T3 at which this cycle has elapsed. Subsequently, the MSB_COUNT is similarly updated each time the MSB changes from 1 to 0.

Note that each of the second to eighth embodiments can be applied to the ninth embodiment.

As described above, according to the ninth embodiment of the present technology, the value obtained by shifting according to the number of times of the overflow is added to the count value, and hence, the count value of the counter 350 can be extended to the upper side.

10. Tenth Embodiment

In the first embodiment described above, the measurement cycle and the number of cycles are the fixed values but can externally be controlled as well. The solid-state imaging element 200 in a tenth embodiment is different from that in the first embodiment in the point that the measurement cycle and the number of cycles are externally controlled.

Figure 37:
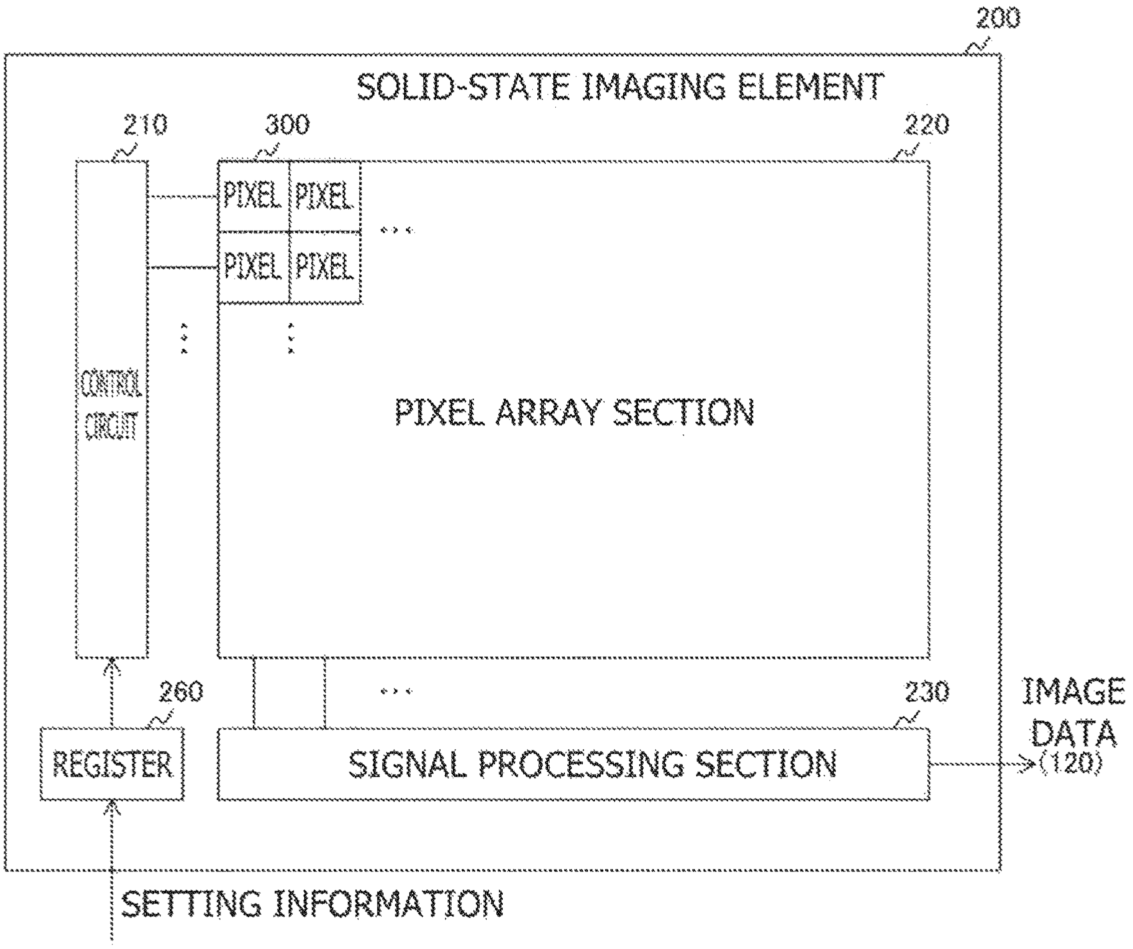
FIG. 37 is a block diagram for illustrating a configuration example of the solid-state imaging element in a tenth embodiment of the present technology.

FIG. 37 is a block diagram for illustrating a configuration example of the solid-state imaging element 200 in the tenth embodiment of the present technology. The solid-state imaging element 200 in this tenth embodiment is different from that in the first embodiment in such a point that the solid-state imaging element 200 further includes a register 260.

The register 260 holds the setting information input externally. The setting information held by the register 260 can externally be rewritten according to a setting of a user or the like. The control circuit 210 reads the setting information from the register 260 and generates the control signals on the basis of this setting information.

Figure 38:
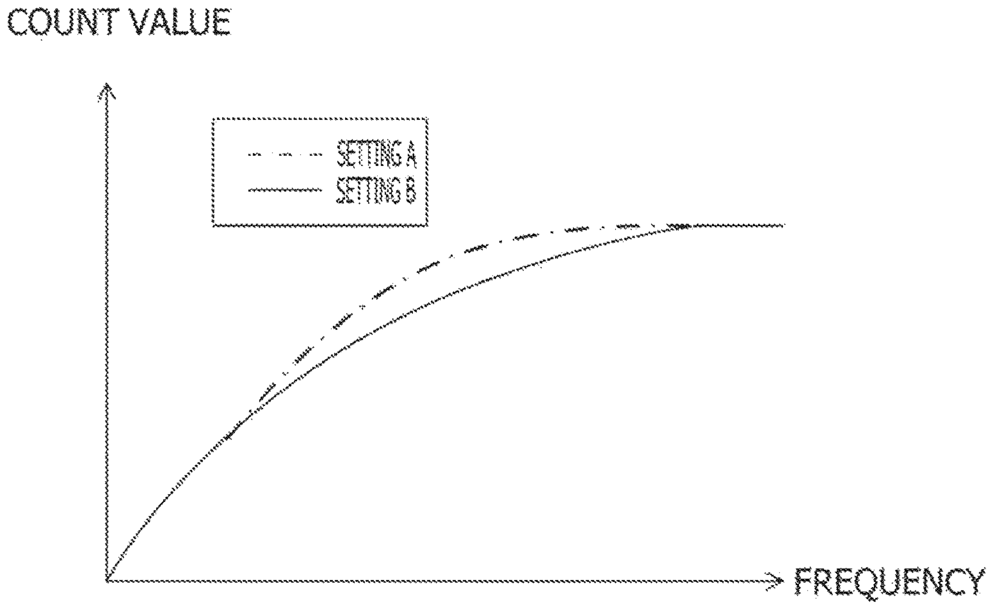
FIG. 38 is a graph for illustrating an example of the input and output characteristic of the pixel in the tenth embodiment of the present technology.

FIG. 38 is a graph for illustrating an example of the input and output characteristic of the pixel 300 in the tenth embodiment of the present technology. A vertical axis of this graph represents the count value (the number of pulses) of the counter 350, and a horizontal axis represents a frequency of the photon entering the pixel 300. Moreover, a solid line of this graph indicates a characteristic of the pixel 300 in a predetermined setting A, and a one-dot chain line indicates a characteristic of the pixel 300 in a setting B.

The target input and output characteristic can be updated as exemplified in this graph by the user writing any values to the register 260 and dynamically updating the setting information.

Note that each of the second to ninth embodiments can be applied to the tenth embodiment.

As described above, according to the tenth embodiment of the present technology, the setting information in the register 260 can externally be updated, and hence, the input and output characteristic of the pixel 300 can externally be controlled.

11. Eleventh Embodiment

In the first embodiment described above, the counter 350 counts the number of pulses, but there is a risk in that the count value saturates when illuminance is high. The solid-state imaging element 200 in an eleventh embodiment is different from that in the first embodiment in such a point that the control signals are masked when the count value exceeds a threshold value.

Figure 39:
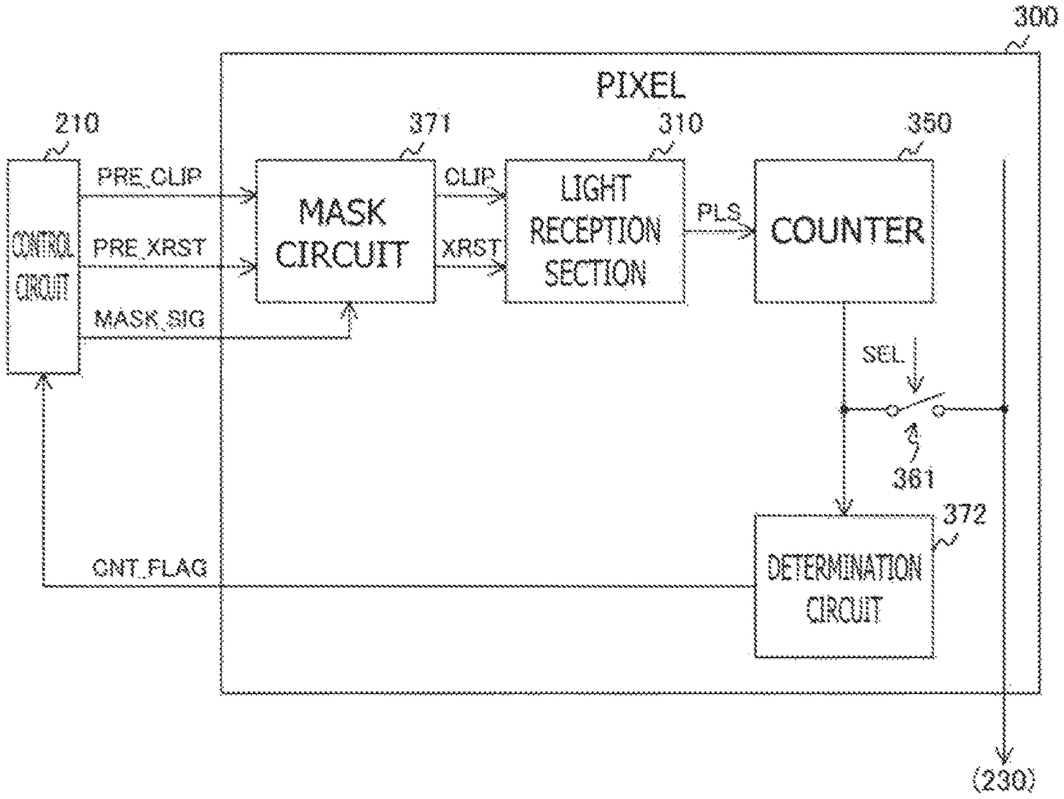
FIG. 39 is a block diagram for illustrating a configuration example of the pixel in an eleventh embodiment of the present technology.

FIG. 39 is a block diagram for illustrating a configuration example of the pixel 300 in the eleventh embodiment of the present technology. The pixel 300 in this eleventh embodiment is different from that in the first embodiment in such a point that the pixel 300 further includes a mask circuit 371 and a determination circuit 372.

The counter 350 in the eleventh embodiment supplies the count value to the selection switch 361 and the determination circuit 372.

The determination circuit 372 determines whether or not the count value exceeds a predetermined threshold value. This determination circuit 372 supplies a determination flag CNT_FLG indicating a determination result to the control circuit 210. For example, the determination flag CNT_FLG is set to the high level in a case in which the count value exceeds the predetermined threshold value, and the determination flag CNT_FLG is set to the low level in a case in which the count value is equal to or smaller than the predetermined threshold value.

The control circuit 210 according to the eleventh embodiment generates an instruction signal MASK_SIG for instructing the mask of the control signals in a case in which the determination flag CNT_FLG is at the high level and supplies the generated instruction signal MASK_SIG to the mask circuit 371. The instruction signal MASK_SIG is repeatedly generated at a fixed cycle. Moreover, the control circuit 210 generates control signals PRE_CLIP and PRE_XRST and supplies the generated control signals PRE_CLIP and PRE_XRST to the mask circuit 371.

The mask circuit 371 masks the control signals PRE_CLIP and PRE_XRST over a fixed period in a case in which the instruction signal MASK_SIG is input. The control signals PRE_CLIP and PRE_XRST are not masked and are directly supplied as the control signals CLIP and XRST to the light reception section 310 in a case in which the instruction signal MASK_SIG is not input.

Figure 40:
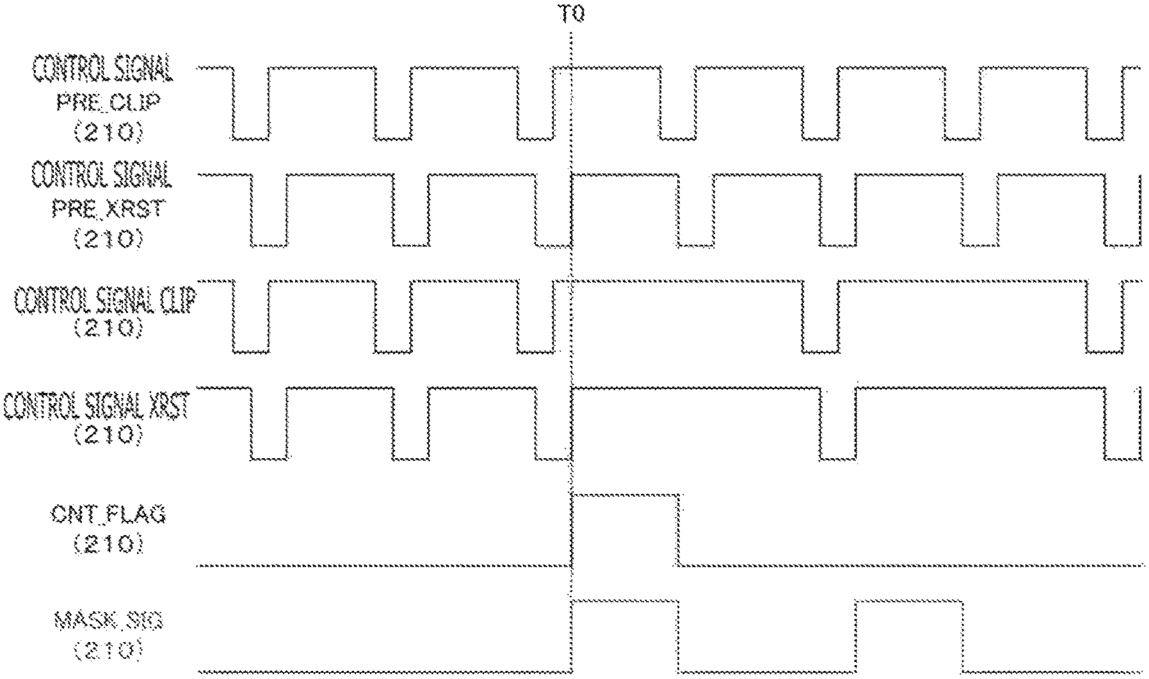
FIG. 40 is a timing chart for illustrating an example of the operation of the solid-state imaging element in the eleventh embodiment of the present technology.

FIG. 40 is a timing chart for illustrating an example of the operation of the solid-state imaging element 200 in the eleventh embodiment of the present technology. It is assumed that the count value exceeds the threshold value at a timing T0. The control signals PRE_CLIP and PRE_XRST are not masked up to this timing T0 and hence are directly supplied as the control signals CLIP and XRST.

The determination circuit 372 sets the determination flag CNT_FLG to the high level at the timing T0, and the control circuit 210 generates the instruction signal MASK_SIG at the fixed cycle. The mask circuit 371 masks the control signals PRE_CLIP and PRE_XRST over a fixed period. It is assumed that the period of applying the mask is longer than the cycle of the control signal PRE_CLIP.

Through the control exemplified in this timing chart, the mask circuit 371 masks the control signals PRE_CLIP and PRE_XRST in a case in which the count value exceeds the threshold value. As a result, it is possible to suppress the saturation of the count value when the illuminance is high.

Note that each of the second to tenth embodiments can be applied to the eleventh embodiment.

As described above, according to the eleventh embodiment of the present technology, the mask circuit 371 masks the control signals when the count value exceeds the threshold value, and hence, the saturation of the count value can be suppressed.

Modification Example

In the eleventh embodiment described above, whether or not the count value exceeds the threshold value is determined in the pixel, and it is required to provide the determination circuit 372 to each pixel in this configuration. The solid-state imaging element 200 in a modification example of the eleventh embodiment is different from that in the eleventh embodiment in such a point that whether or not the count value exceeds the threshold value is determined outside the pixel.

Figure 41:
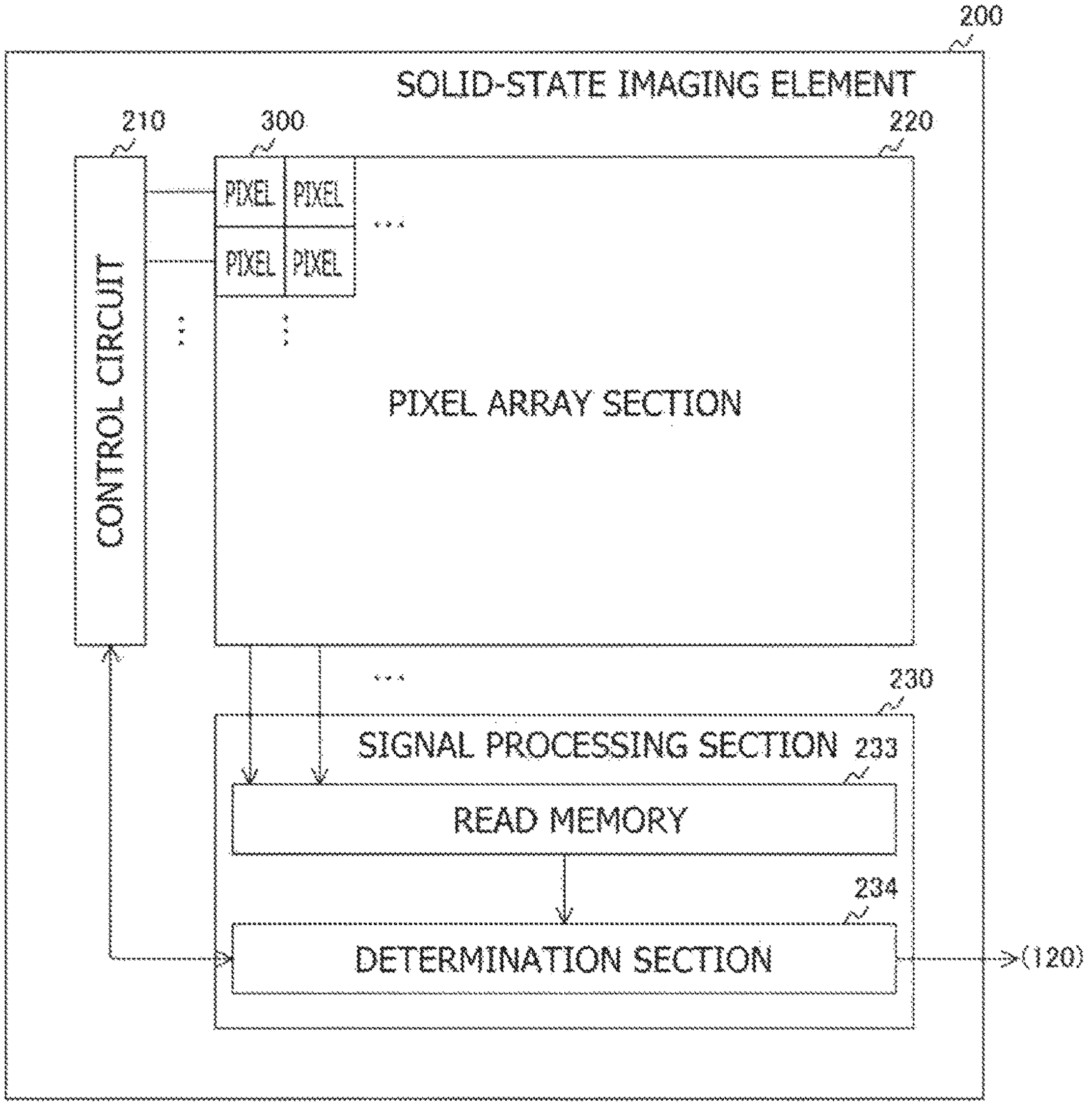
FIG. 41 is a block diagram for illustrating a configuration example of the solid-state imaging element in a modification example of the eleventh embodiment of the present technology.

FIG. 41 is a block diagram for illustrating a configuration example of the solid-state imaging element 200 in the modification example of the eleventh embodiment of the present technology. The signal processing section 230 in this modification example of the eleventh embodiment includes a read memory 233 and a determination section 234.

The read memory 233 holds pixel data (that is, the count value) for each pixel read from the pixel array section 220.

The determination section 234 reads each piece of the pixel data (count value) and determines whether or not the count value exceeds the threshold value for each pixel. The determination section 234 supplies a determination result for each pixel to the control circuit 210. Moreover, the determination section 234 reads the pixel data under the control of the control circuit 210 and outputs the read pixel data to the recording section 120.

The control circuit 210 of the modification example of the eleventh embodiment causes the determination section 234 to sequentially output the pixel data when the exposure period is finished.

Figure 42:
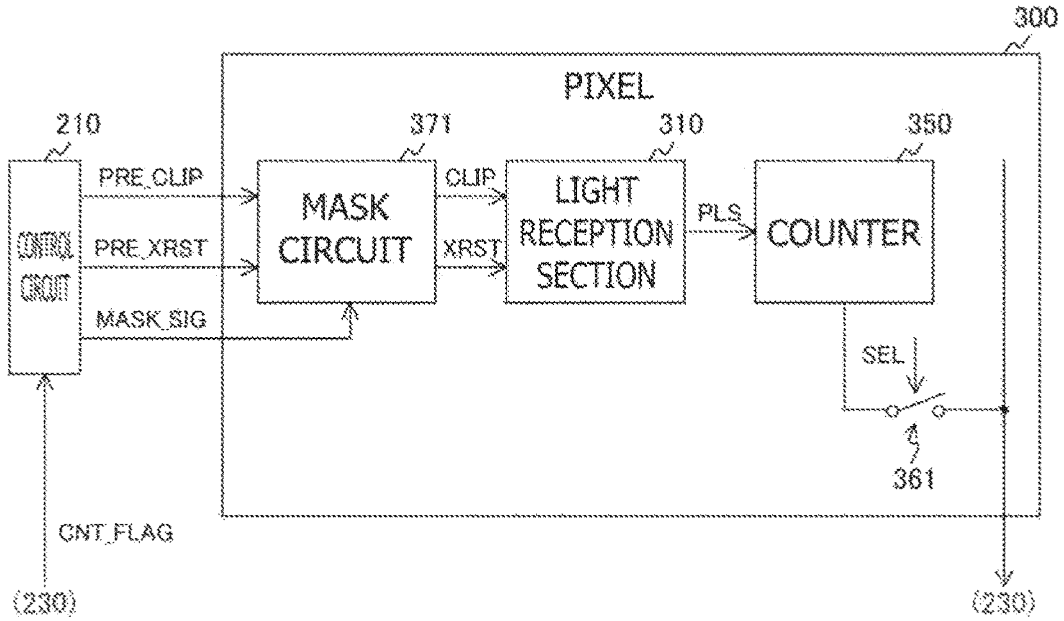
FIG. 42 is a block diagram for illustrating a configuration example of the pixel in the modification example of the eleventh embodiment of the present technology.

FIG. 42 is a block diagram for illustrating a configuration example of the pixel 300 in the modification example of the eleventh embodiment of the present technology. The pixel 300 in this modification example of the eleventh embodiment is different from that in the eleventh embodiment in such a point that the determination circuit 372 is not arranged.

Moreover, the control circuit 210 in the modification example of the eleventh embodiment causes the pixel data to be output to the signal processing section 230 through the selection signal SEL at a predetermined timing before the end of the exposure period.

As exemplified in FIG. 41 and FIG. 42, it is possible to eliminate the determination circuit 372 in the pixel 300 by determining, outside the pixel 300, whether or not the count value exceeds the threshold value.

Note that each of the second to tenth embodiments can be applied to the modification example of the eleventh embodiment.

As described above, according to the modification example of the eleventh embodiment of the present technology, whether or not the count value exceeds the threshold value is determined outside the pixel 300, and hence, the circuit scale of the pixel 300 can be reduced.

12. Twelfth Embodiment

In the first embodiment described above, the clip transistor 312 connects the cathode of the SPAD 311 to the detection node 314, but, in place of the cathode, the anode can also be connected to the detection node 314. The solid-state imaging element 200 in a twelfth embodiment is different from that in the first embodiment in such a point that the clip transistor connects the anode of the SPAD 311 to the detection node 314.

Figure 43:
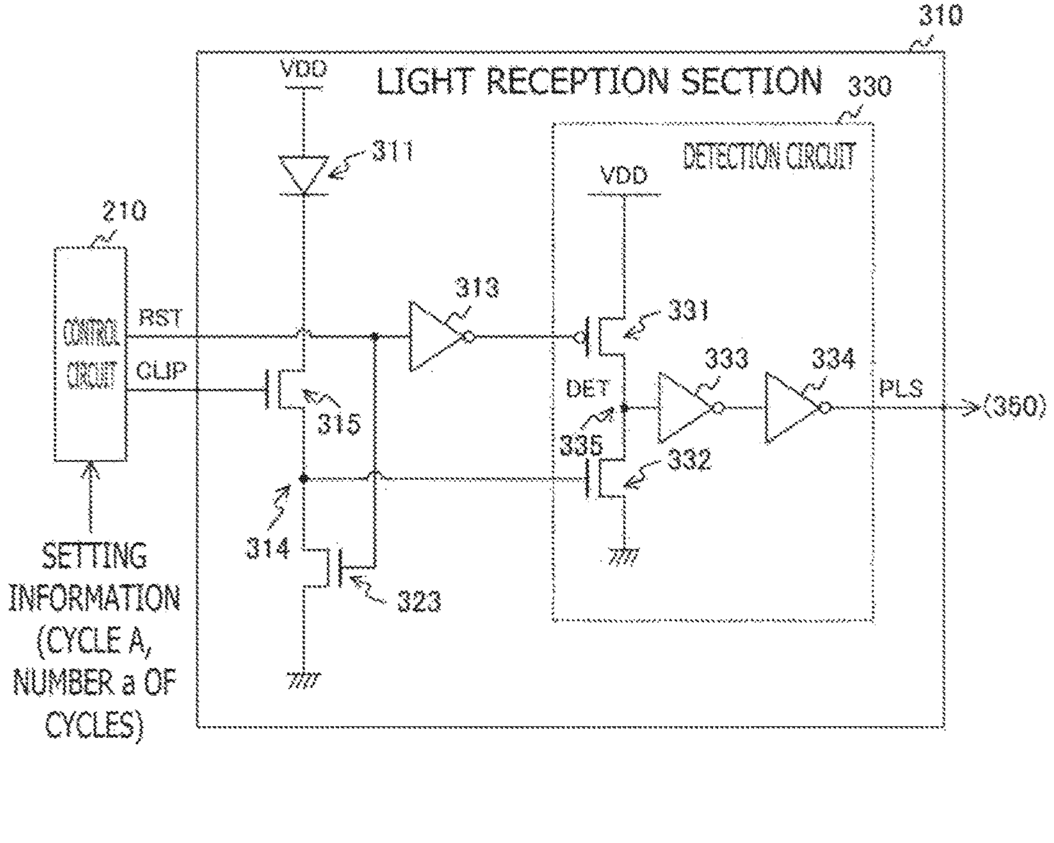
FIG. 43 is a circuit diagram for illustrating a configuration example of the light reception section in a twelfth embodiment of the present technology.

FIG. 43 is a block diagram for illustrating a configuration example of the pixel 300 in the twelfth embodiment of the present technology. In the pixel 300 in this twelfth embodiment, in place of the pMOS recharge transistor 321 and the pMOS clip transistor 312, an nMOS recharge transistor 323 and an nMOS clip transistor 315 are arranged.

The cathode of the SPAD 311 is connected to the power supply voltage VDD. The clip transistor 315 is inserted between the anode of the SPAD 311 and the detection node 314. The recharge transistor 323 is inserted between the detection node 314 and the ground terminal.

Moreover, a control signal RST is input to the inverter 313 and a gate of the recharge transistor 323. The control signal RST is similar to a signal obtained by inverting the control signal XRST Moreover, the detection node 314 is connected to a gate of the nMOS transistor 332, and an output terminal of the inverter 313 is input to a gate of the pMOS transistor 331.

As exemplified in this diagram, the capacitance of the anode can be reduced by inserting the clip transistor 315 between the anode of the SPAD 311 and the detection node 314, so that the consumed electric power can be reduced.

Note that each of the second to eleventh embodiments can be applied to the twelfth embodiment.

As described above, according to the twelfth embodiment of the present technology, the clip transistor 315 is inserted between the anode of the SPAD 311 and the detection node 314, and hence, the capacitance of the anode is reduced, so that the consumed electric power can be reduced.

13. Example of Application to Mobile Body

The technology according to the present disclosure (present technology) can be applied to various products. For example, the technology according to the present disclosure may be embodied as a device mounted to a mobile body of any type such as a vehicle, an electric vehicle, a hybrid electric vehicle, a motorcycle, a bicycle, a personal mobility, an airplane, a drone a vessel, and a robot.

Figure 44:
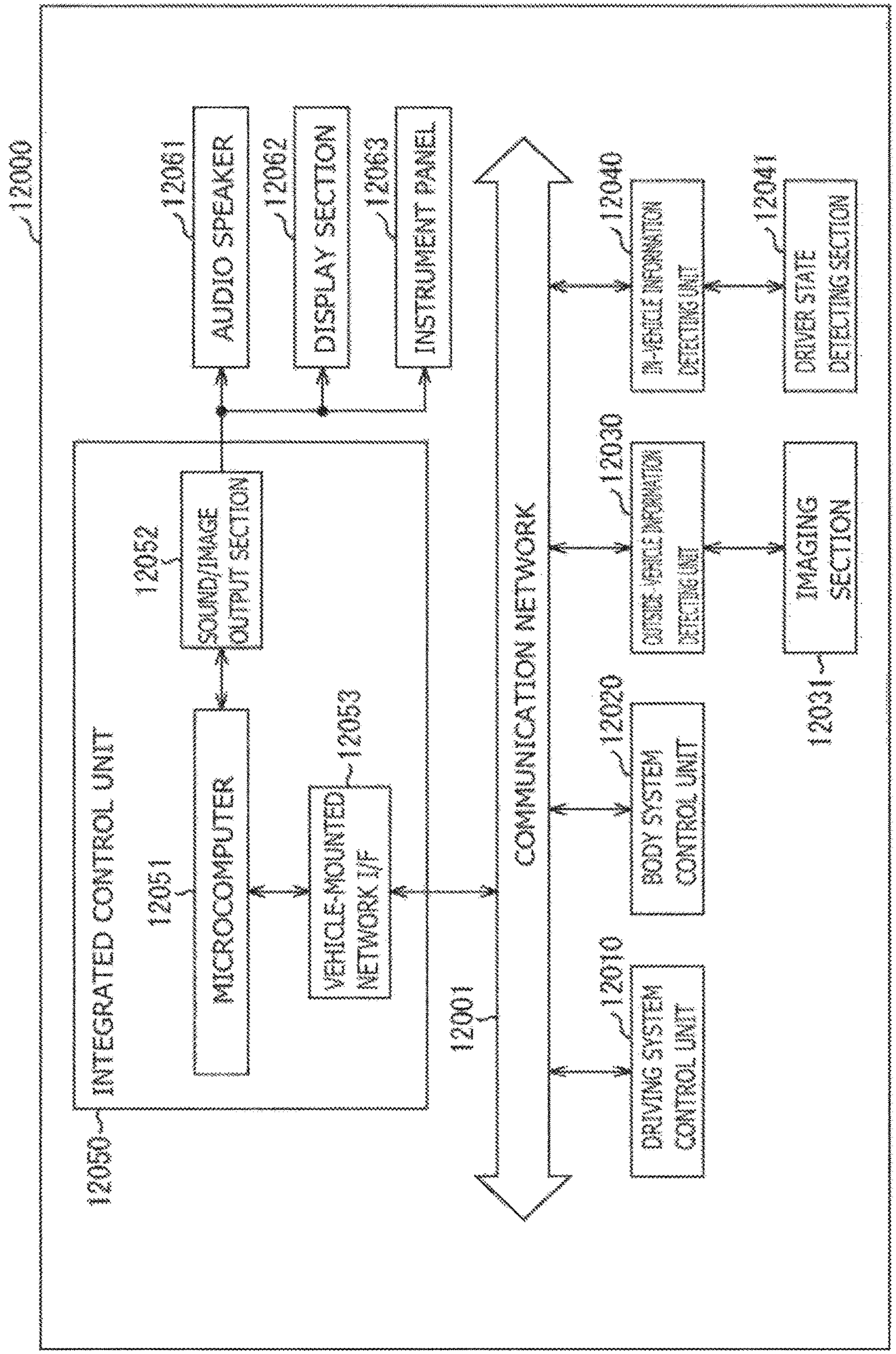
FIG. 44 is a block diagram depicting an example of schematic configuration of a vehicle control system.

FIG. 44 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 44, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 44, an audio speaker 12061, a display section 12062, and an instrument panel 12063 are illustrated as the output device. The display section 12062 may, for example, include at least one of an on-board display and a head-up display.

Figure 45:
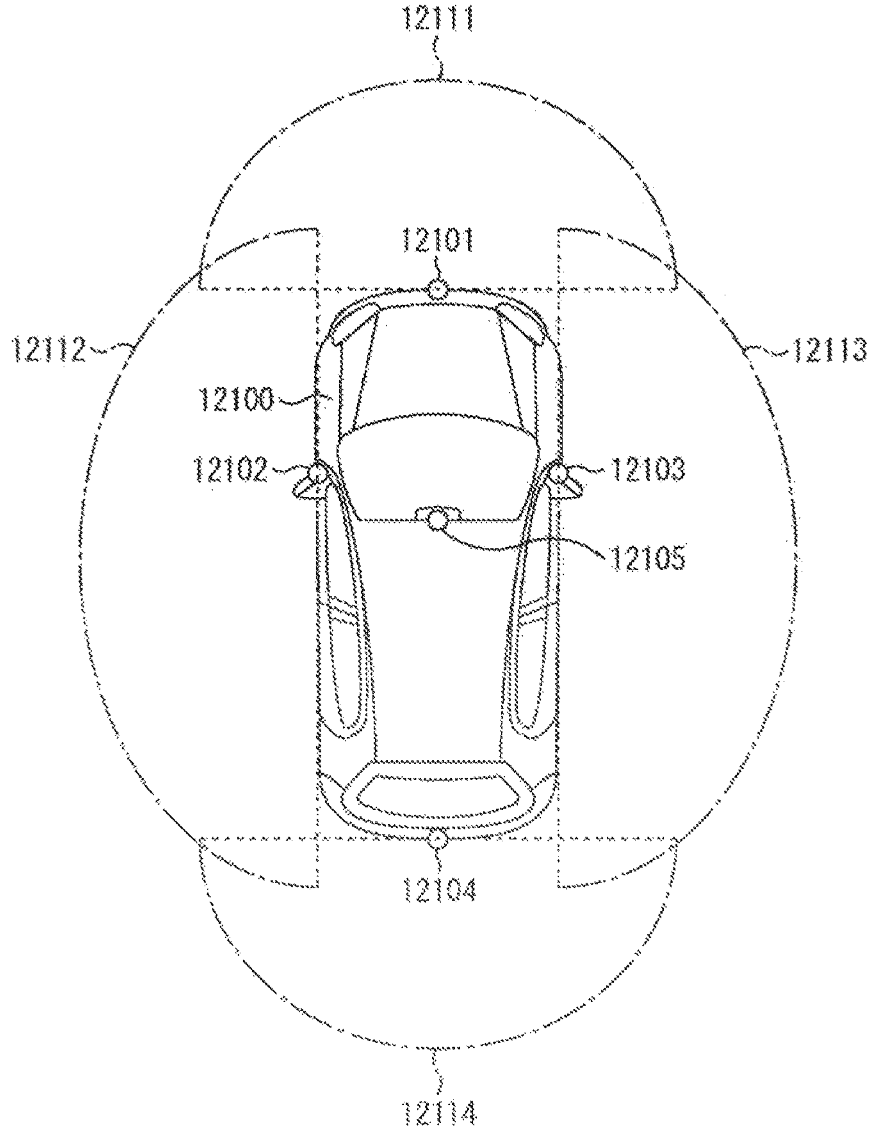
FIG. 45 is a diagram of assistance in explaining an example of installation positions of an outside-vehicle information detecting section and an imaging section.

FIG. 45 is a diagram depicting an example of the installation position of the imaging section 12031.

In FIG. 45, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 45 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to the present disclosure can be applied has been described above. The technology according to the present disclosure can be applied to, for example, the imaging section 12031 of the configuration described above. Specifically, the imaging device 100 of FIG. 1 can be applied to the imaging section 12031." and the like). Application of the technology according to the present disclosure to the imaging section 12031 reduces consumed electric power, so that a performance of the mobile body control system can be increased.

Note that the embodiments described above indicate examples for embodying the present technology, and the matters in the embodiments and the matters used to specify the invention in CLAIMS have correspondence. Similarly, the matters used to specify the invention in CLAIMS and matters in the embodiments of the present technology given the same name have correspondence. Note that the present technology is not limited to the embodiments and can be embodied by applying various modifications to the embodiments without departing from the gist of the present technology.

Note that the effects described in the present specification are merely exemplary and not limitative, and other effects may be provided.

Note that the present technology can also take the following configuration.

(1)

A light detection element including:

a photoelectric conversion section;

a disconnection section which connects the photoelectric conversion section and a predetermined detection node to each other in a predetermined connection period and disconnects the photoelectric conversion section from the detection node in a wait period not corresponding to the connection period; and a recharge section which supplies a predetermined voltage to the detection node over a predetermined period from a predetermined recharge start timing in the connection period.

(2)

The light detection element according to (1) above, further including:

a control circuit which controls the disconnection section and the recharge section.

(3)

The light detection element according to (2) above, in which the control circuit changes a length of a detection cycle including the wait period and the connection period.

(4)

The light detection element according to (2) or (3) above, further including:

a level shifter which changes a level of the clip control signal.

(5)

The light detection element according to any one of (2) to (4) above, in which the recharge section includes a pair of transistors serially connected between the detection node and a predetermined power supply voltage, a first control signal is input to a gate of one of the pair of transistors, a second control signal is input to a gate of the other one of the pair of transistors, and the control circuit supplies the first and second control signals.

(6)

The light detection element according to any one of (2) to (5) above, in which the photoelectric conversion section, the disconnection section, and the recharge section are arranged for each of multiple pixels, and a start timing of the connection period and the recharge start timing are different from one another among a plurality of areas.

(7)

The light detection element according to any one of (2) to (6) above, further including:

a register which holds input setting information, in which the control circuit controls the disconnection section and the recharge section on the basis of the held setting information.

(8)

The light detection element according to any one of (2) to (7) above, further including:

a detection circuit which generates a pulse signal on the basis of electric potential of the detection node; and a counter which counts the number of pulses of the pulse signal, thereby generating a count value.

(9)

The light detection element according to (8) above, further including:

an inverter which inverts a control signal from the control circuit to supply the inverted control signal as an inverted signal, in which the detection circuit generates the pulse signal on the basis of the electric potential of the detection node and the inverted signal.

(10)

The light detection element according to (8) or (9) above, further including:

an arithmetic operation circuit which adds a value obtained by shifting according to a shifting number same as the number of times of overflow of the counter and a bit string indicating the count value to each other.

(11)

The light detection element according to any one of (8) to (10) above, further including:

a mask circuit which masks control signals from the control circuit to the disconnection section and the recharge section in a case in which the number of pulses exceeds a predetermined threshold value.

(12)

The light detection element according to any one of (8) to (11) above, in which the detection circuit generates the pulse signal on the basis of the electric potential of the detection node and a control signal from the control circuit.

(13)

The light detection element according to (12) above, in which the detection circuit includes a pMOS transistor and an nMOS transistor serially connected between a power supply voltage and a ground voltage, a gate of the pMOS transistor is connected to the detection node, and the control signal is input to a gate of the nMOS transistor.

(14)

The light detection element according to (12) above, in which the detection circuit includes first and second pMOS transistors and an nMOS transistor serially connected between a power supply voltage and a ground voltage, a gate of the second pMOS transistor is connected to the detection node, and the initialization control signal is input to each of gates of the first pMOS transistor and the nMOS transistor.

(15)

The light detection element according to any one of (1) to (14) above, in which the photoelectric conversion section is arranged in a predetermined layer, and the disconnection section and the recharge section are arranged in a layer different from the predetermined layer.

(16)

The light detection element according to any one of (1) to (15) above, in which the disconnection section is inserted between a cathode of the photoelectric conversion section and the detection node.

(17)

The light detection element according to any one of (1) to (15) above, in which the disconnection section is inserted between an anode of the photoelectric conversion section and the detection node.

(18)

The light detection element according to any one of (1) to (17) above, in which the photoelectric conversion section includes an avalanche photodiode.

(19)

The light detection element according to any one of (1) to (18) above, in which the disconnection section includes a clip transistor inserted between the detection node and the photoelectric conversion section.

(20)

A light detection device including:

a photoelectric conversion section;

a disconnection section which connects the photoelectric conversion section and a predetermined detection node to each other in a predetermined connection period and disconnects the photoelectric conversion section from the detection node in a wait period not corresponding to the connection period;

a recharge section which supplies a predetermined voltage to the detection node over a predetermined period from a predetermined recharge start timing in the connection period; and a recording section which records data generated from electric potential of the detection node.

REFERENCE SIGNS LIST

100: Imaging device
110: Imaging lens
120: Recording section
130: Imaging control section
200: Solid-state imaging element
201: Top layer
202: Middle layer
203: Bottom layer
210: Control circuit
211 to 213: Control signal generation circuit
220: Pixel array section
230: Signal processing section
231: Arithmetic operation circuit
232: Frame memory
233: Read memory
234: Determination section
240: Level shifter
250: Shift control section
251, 252: Shift register
253: Flipflop
260: Register
300: Pixel
310: Light reception section
311: SPAD
312, 315: Clip transistor
313, 333, 334: Inverter
320: Recharge section
321, 322, 323: Recharge transistor
330: Detection circuit
331, 336: pMOS transistor
332: nMOS transistor
350: Counter
361, 362: Selection switch
371: Mask circuit
372: Determination circuit
12031: Imaging section

The invention claimed is:

1. A sensing device, comprising:

a photodetector comprising an anode electrode and a cathode electrode;

a first transistor comprising a first end and a second end, wherein the first end of the first transistor is coupled to one of the anode electrode or the cathode electrode of the photodetector;

a second transistor comprising a first end and a second end, wherein the first end of the second transistor is coupled to the second end of the first transistor;

a third transistor comprising a first end and a second end, wherein the first end of the third transistor is coupled to the second end of the second transistor, and the second end of the third transistor is coupled to a first potential (Vdd);

a fourth transistor comprising a first end, a second end, and a gate, wherein the gate of the fourth transistor is coupled to the second end of the first transistor and the first end of the second transistor;

a fifth transistor comprising a first end, a second end, and a gate, wherein the first end of the fifth transistor is coupled to the second end of the fourth transistor, and the second end of the fifth transistor is coupled to the first potential;

a sixth transistor comprising a first end, a second end, and a gate, wherein the first end of the sixth transistor is coupled to a second potential (GND), the second end of the sixth transistor is coupled to the first end of the fourth transistor, and the gate of the sixth transistor is coupled to the gate of the fifth transistor; and a first inverter comprising a first end and a second end, wherein the first end of the first inverter is coupled to the first end of the fourth transistor and the second end of the sixth transistor, the first transistor, the second transistor, the third transistor, the fourth transistor, and the fifth transistor are a first type and the sixth transistor is a second type different from the first type.

2. The sensing device according to claim 1, wherein the first type includes PMOS transistors.

3. The sensing device according to claim 1, wherein the second type includes NMOS transistor.

4. The sensing device according to claim 1, further comprising a second inverter, wherein a detection circuit includes the fourth transistor, the fifth transistor, the sixth transistor, the first inverter, and the second inverter.

5. The sensing device according to claim 1, further comprising a second inverter, wherein the second inverter includes a first end and a second end, and the first end of the second inverter is coupled with the second end of the first inverter.

6. The sensing device according to claim 5, wherein the second inverter is configured to:

receive an inverted signal from the second end of the first inverter; and invert the received inverted signal from the first inverter.

7. The sensing device according to claim 6, wherein the second end of the first inverter is configured to output the inverted signal to the first end of the second inverter.

8. The sensing device according to claim 6, wherein the second end of the second inverter is configured to output the inverted signal to a counter as a pulse signal (PLS).

* * * * *